US008922780B2

(12) United States Patent
Mohazzab et al.

(10) Patent No.: US 8,922,780 B2
(45) Date of Patent: Dec. 30, 2014

(54) SHAPE MEASUREMENT USING MICROCHIP BASED FRINGE PROJECTION

(75) Inventors: Masoud Mohazzab, Andover, MA (US); Liang Chen, Woburn, MA (US)

(73) Assignee: Andover Photonics, Inc., Woburn, MA (US)

( * ) Notice: Subject to any disclaimer, the term of this patent is extended or adjusted under 35 U.S.C. 154(b) by 985 days.

(21) Appl. No.: 12/780,389

(22) Filed: May 14, 2010

(65) Prior Publication Data

US 2010/0290060 A1 Nov. 18, 2010

Related U.S. Application Data

(60) Provisional application No. 61/216,230, filed on May 14, 2009, provisional application No. 61/269,654, filed on Jun. 26, 2009, provisional application No. 61/270,821, filed on Jul. 14, 2009.

(51) Int. Cl.
*G01B 9/02* (2006.01)
*G01B 11/25* (2006.01)

(52) U.S. Cl.
CPC ..................... *G01B 11/25* (2013.01)
USPC ........................................ 356/477

(58) Field of Classification Search
USPC ..................... 356/477, 511; 385/14
See application file for complete search history.

(56) References Cited

U.S. PATENT DOCUMENTS

| | | | |
|---|---|---|---|
| 4,505,588 A * | 3/1985 | Ludman et al. | 356/477 |
| 5,870,191 A | 2/1999 | Shirley et al. | |
| 6,031,612 A | 2/2000 | Shirley | |
| 6,522,793 B1 * | 2/2003 | Szilagyi et al. | 385/2 |
| 6,690,474 B1 | 2/2004 | Shirley | |
| 6,952,270 B2 | 10/2005 | Shirley | |
| 7,242,484 B2 | 7/2007 | Shirley | |
| 7,324,207 B1 * | 1/2008 | Kirkpatrick et al. | 356/478 |
| 7,860,408 B2 | 12/2010 | Isomura et al. | |
| 8,477,318 B2 * | 7/2013 | Dillon et al. | 356/511 |
| 2001/0041025 A1 * | 11/2001 | Farahi | 385/14 |
| 2007/0055117 A1 * | 3/2007 | Alphonse | 600/310 |

FOREIGN PATENT DOCUMENTS

| | | |
|---|---|---|
| JP | 2007-201939 | 8/2007 |
| WO | 2009/058657 | 5/2009 |

OTHER PUBLICATIONS

M. L. M. Balistreri, et al. "Phase Mapping of Optical Fields in Integrated Optical Waveguide Structures" *Journal of Lightwave Technology*, vol. 19, No. 8 (Aug. 2001).

* cited by examiner

*Primary Examiner* — Jonathan Hansen
(74) *Attorney, Agent, or Firm* — Occhiuti & Rohlicek LLP

(57) ABSTRACT

A system for measuring a shape of a target object includes a photonic integrated circuit and a light detector. The photonic integrated circuit includes a phase shifter configured to change a phase difference between a first portion of light and a second portion of light within the phase shifter, and an output element configured to output the light from the phase shifter directly toward the target object. The output element includes a first output waveguide configured to act as a first point source; and a second output waveguide configured to act as a second point source. The light detector is positioned to receive reflected light from the target object.

31 Claims, 20 Drawing Sheets

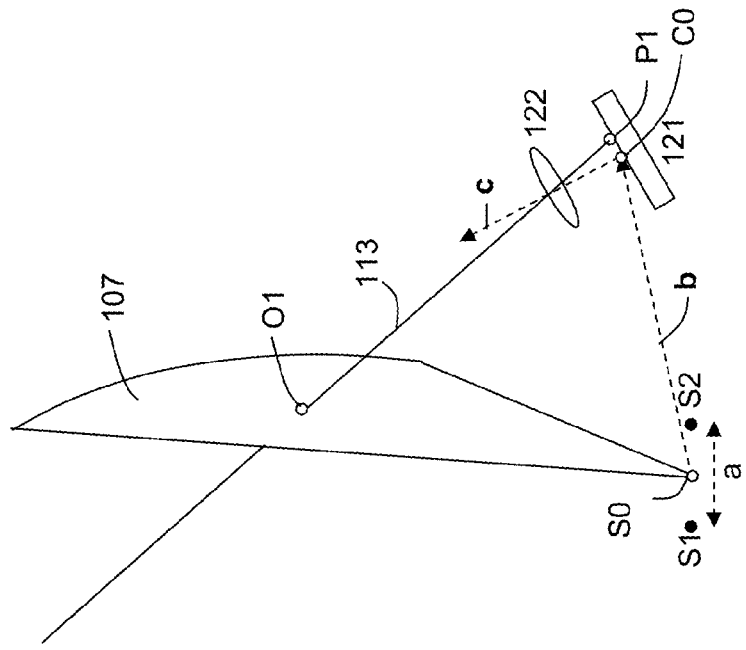
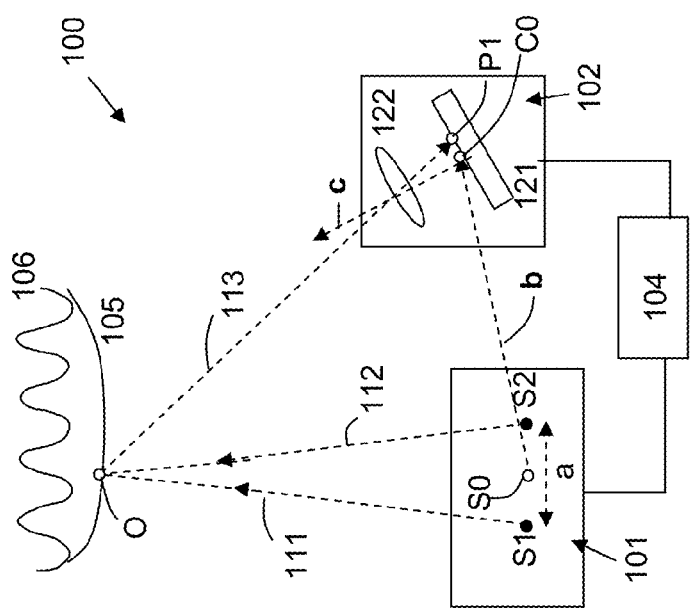
Fig. 1A
Fig. 1B

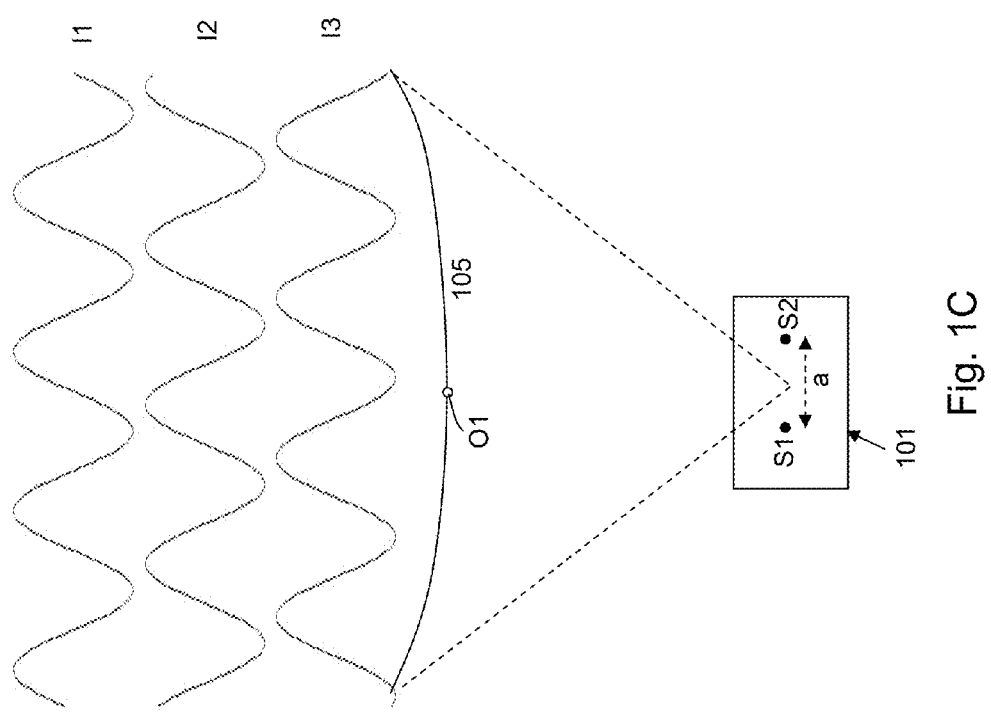

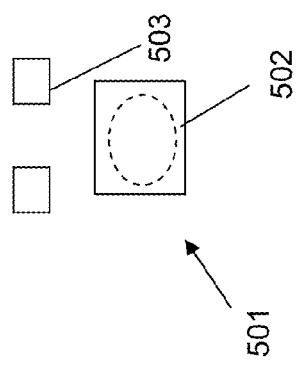
Fig. 5A
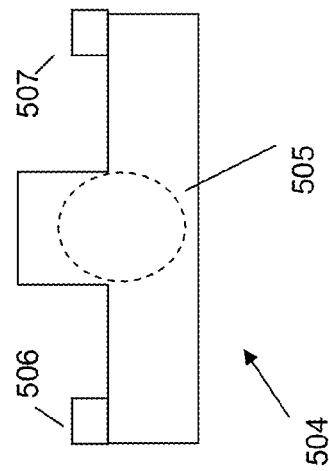
Fig. 5B
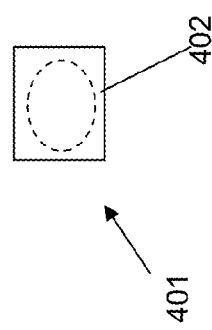
Fig. 4A
Fig. 4B

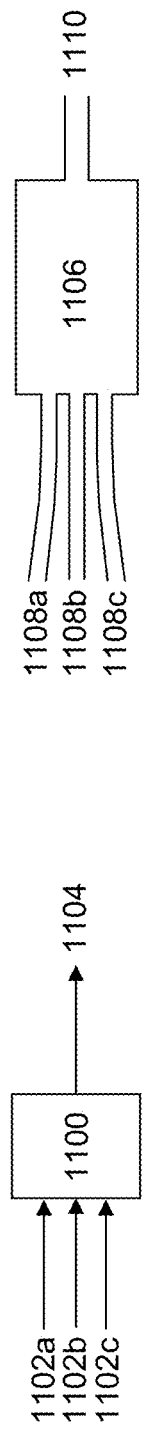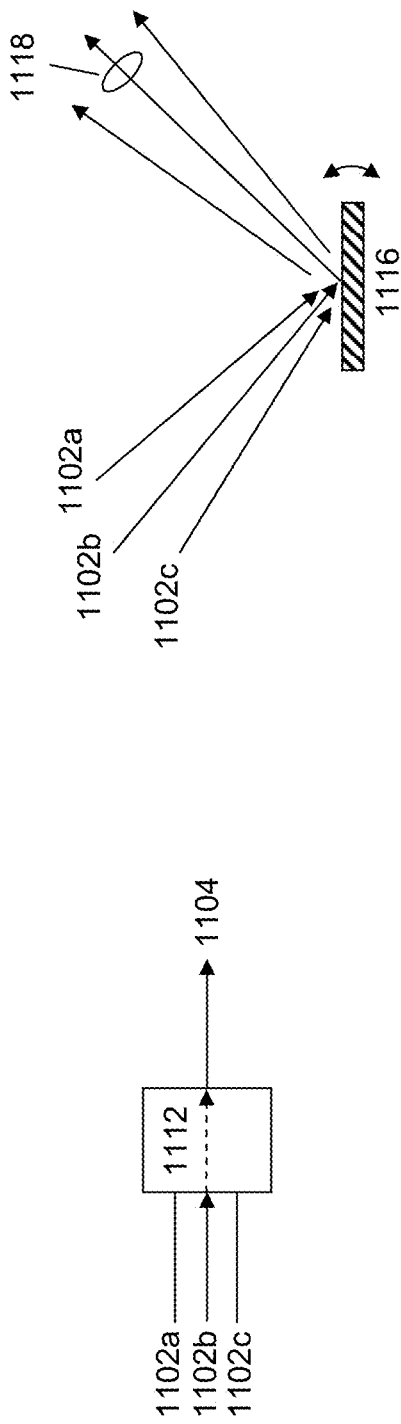

φ1 with λ1; or φ2 with λ2; or φ3 with λ3

φ1 with TE or φ2 with TM

SHAPE MEASUREMENT USING MICROCHIP BASED FRINGE PROJECTION

CROSS-REFERENCE TO RELATED APPLICATIONS

This application claims priority to U.S. Provisional Application No. 61/216,230, filed May 14, 2009, and entitled "Micro-chip fringe projectors used for 3D imaging system;" U.S. Provisional Application No. 61/269,654, filed Jun. 26, 2009, and entitled "Micro-chip fringe projectors comprising multiple phase shifters for 3D imaging system;" and U.S. Provisional Application No. 61/270,821, filed Jul. 14, 2009, and entitled "Micro-chip fringe projector using delay line interferometric phase shifter for 3D imaging system," the contents of all of which are incorporated herein by reference.

BACKGROUND

Non-contact shape measurement of objects is of great interest in many areas of technology, medicine, and art. In industrial applications, accurately examining the shape of machine parts and tolerances is of great importance. Recently, dentists have used non-contact shape measurement devices to image and document the three-dimensional (3D) shape of the teeth. Documentation of antique artifacts is another application for 3D shape measurement systems.

Many devices and methods have been developed for precision of 3D measurements. Among these, methods based on structured light projectors have attracted the most attention. Structured light techniques are considered to be one of the most effective, reliable, and robust optical non-contact methods for 3D surface height measurement. A common structured light projector is a fringe projector that is composed of lines with different intensities. The fringes can be generated by digital light processing (DLP), by a slide inserted in a light projector, or by two coherent light spots located a short distance apart (such as in Young's double slit experiment). Fringe projection based on Young's double slit experiment has the advantage of having infinite depth of focus with infinite spatial resolution, making it attractive for 3D imaging systems.

Several devices, methods and algorithms have been developed as the bases of 3D shape measurements systems using fringes. For example, fringe phases are shifted and imaged by an imaging sensor, such as a CCD or CMOS camera, and the phase on the surface is measured. This method is known as phase shifting interferometry (PSI).

A $2\pi$ ambiguity exists in phase determination using PSI methods and additional efforts are needed to resolve this ambiguity. Methods for resolving phase ambiguity resulting from PSI are known as phase unwrapping methods. Over the years several methods and algorithms have been developed to solve phase unwrapping problems. For instance, the use of more than one fringe projector, each with a different fringe frequency, can unambiguously resolve the phase wrapping problem.

SUMMARY

In a general aspect, a system for measuring a shape of a target object includes a photonic integrated circuit and a light detector. The photonic integrated circuit includes a phase shifter configured to accept input light and to emit a plurality of portions of light, each portion of light having a different phase, and an output element configured to output the light emitted from the phase shifter directly toward the target object. The output element includes a first output waveguide configured to act as a first point source; and a second output waveguide configured to act as a second point source. The light detector is positioned to receive reflected light from the target object.

Embodiments may include one or more of the following. The phase shifter includes an input splitter configured to divide the input light into at least a first portion of light and a second portion of light; a first phase shifter waveguide configured to receive the first portion of the light and to change the phase of the first portion of the light; and a second phase shifter waveguide configured to receive a second portion of the light. The first output waveguide is configured to output the first portion of the light and the second output waveguide is configured to output the second portion of the light. The first portion of the light and the second portion of the light are coherent.

The photonic integrated circuit comprises a plurality of phase shifters, each phase shifter configured to accept input light and to emit a plurality of portions of light, each portion of light having a different phase.

The output element is configured to output the light emitted from each of the plurality of phase shifters. The photonic integrated circuit further comprises a combiner configured to combine the light emitted from the plurality of phase shifters and to provide the combined light to the output element.

The photonic integrated circuit further comprises a plurality of output elements, each output element configured to output the light emitted from at least one of the plurality of phase shifters. That is, in some examples, multiple phase shifters may be associated with each output element. A separation between the first output waveguide and the second output waveguide is the same for each output element. A separation between the first output waveguide and the second output waveguide is different for each output element.

The plurality of first output waveguides are positioned in a first region of the photonic integrated circuit and the plurality of second output waveguides are positioned in a second region of the photonic integrated circuit.

Each of the plurality of phase shifters is associated with at least one of light at a different wavelength and light of a different polarization.

The photonic integrated circuit further includes an output delivering system configured to deliver the light emitted from the phase shifter to the output element, the output delivering system comprising at least one of an integrated circuit based optical beam splitter, an integrated circuit based optical combiner, an integrated circuit based optical beam attenuator, and an integrated circuit based on-off switch.

The photonic integrated circuit includes a first integrated circuit including the phase shifter; and a second integrated circuit including the output element. The system further includes an output delivering system configured to deliver the light emitted from of the phase shifter to the output element, the output delivering system comprising at least one of an optical lens, an optical beam splitter, an optical combiner, an optical beam attenuator, and an on-off switch.

The photonic integrated circuit further includes a light source configured to provide coherent input light to the phase shifter. The light source includes at least one of a laser, a coherent light emitting diode (LED), and a superluminescent LED. The photonic integrated circuit further comprises an input delivering system configured to deliver light from the light source to the phase shifter, the input delivering system comprising at least one of an integrated circuit based optical beam splitter, an integrated circuit based optical combiner, an integrated circuit based optical beam attenuator, and an integrated circuit based on-off switch.

The system further includes a light source configured to provide coherent input light to the photonic integrated circuit. The light source includes at least one of a laser, a coherent LED, and a superluminescent LED. The system further includes an input delivering system configured to deliver light from the light source to the phase shifter, the input delivering system comprising at least one of an optical lens, an optical beam splitter, an optical combiner, an optical beam attenuator, and an on-off switch. In some examples, the input delivering system may be located on the photonic integrated circuit, off the photonic integrated circuit, or partially on and partially off the photonic integrated circuit.

The phase shifter is configured to change the phase of at least one of the plurality of portions of light by at least one of an electro-optic effect, a thermo-optic effect, and an acoustic-optic effect.

The system further includes a processor configured to determine a shape of at least a portion of the target object on the basis of the detected reflected light.

In another general aspect, a method for determining a shape of a target object includes receiving input light into a phase shifter fabricated on a photonic integrated circuit; emitting a plurality of portions of light from the phase shifter, each portion of light having a different phase; receiving the plurality of portions of light emitted from the phase shifter an output element fabricated on the photonic integrated circuit; outputting the light from the output element directly toward the target object; and detecting light reflected from the target object.

Embodiments may include one or more of the following.

Receiving the input light into the phase shifter includes directing a first portion of the input light into a first phase shifter waveguide; and directing a second portion of the input light into a second phase shifter waveguide. The first phase shifter waveguide is configured to change the phase of the first portion of the input light relative to the phase of the second portion of the input light.

The method further includes applying an electric power to at least a part of the phase shifter.

Receiving input light into the phase shifter includes receiving input light into at least some of a plurality of phase shifters fabricated on the photonic integrated circuit. Receiving input light into the phase shifter includes selecting at least one of the plurality of phase shifters to change the phase of a first portion of light emitted by the selected phase shifter relative to a second portion of the light emitted by the selected phase shifter.

Receiving the plurality of portions of light emitted from the phase shifter into the output element includes receiving the light emitted from at least some of the plurality of phase shifters into the output element. Receiving the plurality of portions of light emitted from the phase shifter into the output element includes receiving the light emitted from each of at least some of the plurality of phase shifters into a corresponding one of a plurality of output elements.

Receiving input light into the plurality of phase shifters includes receiving input light having at least one of a different wavelength and a different polarization into each of the plurality of phase shifters.

The method further includes controlling at least some of the plurality of phase shifters to generate a plurality of consecutive phase changes in the received input light. In some instances, at least some of the plurality of phase shifters are static phase shifters and the method further includes controlling at least some of the plurality of phase shifters to generate a predetermined phase change in the received input light. The method further includes determining a shape of at least a portion of the target object on the basis of the detected light.

Among other advantages, the systems and methods described herein are able to shift the phase of light using a system-on-chip (SoC) solution. Using a micro-chip based fringe projector, PSI techniques together with standard phase unwrapping algorithms can be performed. Using an image sensor, the fringes from PSI can be captured and phases can be unwrapped to render 3D shape measurements of objects.

Fringes with infinite depth of focus can be generated, enabling high precision shape measurements. The fringe generation system is stable, not complex, and relatively inexpensive. Furthermore, little to no calibration is needed.

Fringe projection at multiple phase settings can be simplified by the use of a plurality of phase shifters on a single chip because phase feedback control is allowed to control only the stability of the setpoint with no concern to ramping processes.

Other features and advantages of the invention are apparent from the following description and from the claims.

BRIEF DESCRIPTION OF DRAWINGS

FIGS. 1A-1D are block diagrams of a 3D imaging system.
FIGS. 4A and 4B are schematic diagrams of waveguides.
FIGS. 5A and 5B are schematic diagrams of heating configurations for waveguides.
FIGS. 11A-11F are schematic diagrams of light path combiners.

DETAILED DESCRIPTION

1 Three-Dimensional Shape Measurement

Figure 1D:
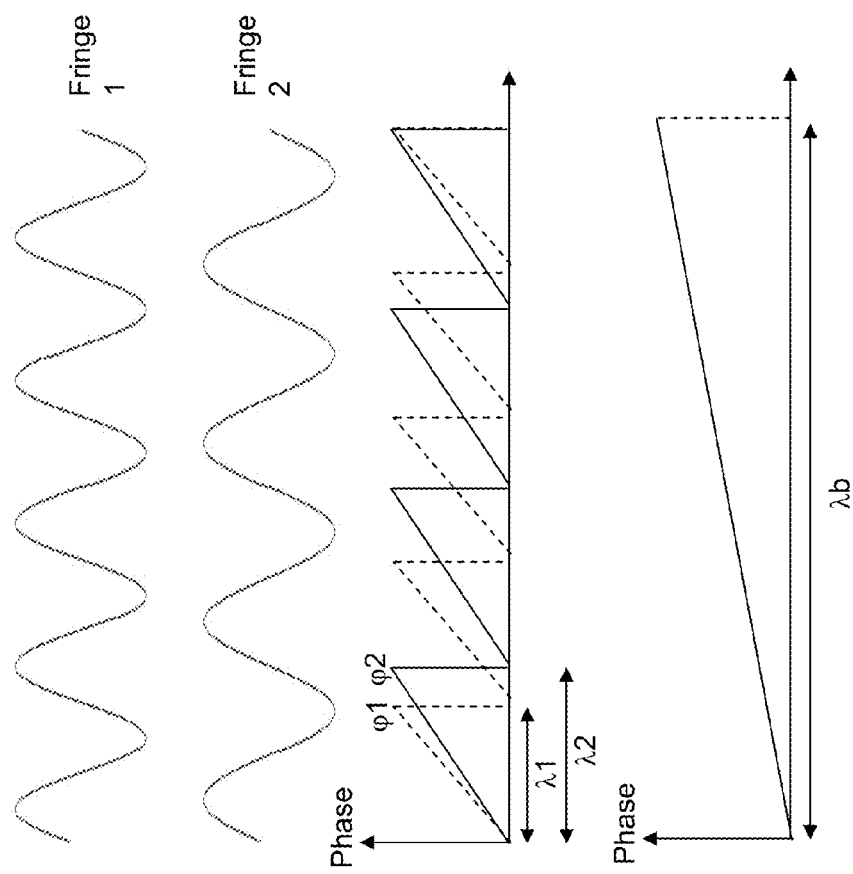

Referring to FIG. 1A, a three-dimensional (3D) shape measurement apparatus 100 is used to measure the 3D surface shape or surface point coordinates of a target object 105. Measurement apparatus 100 employs a Young's coherent light pattern projector 101 which projects a mathematically known interference light pattern or fringe pattern 106 onto the surface of object 105. Due to the 3D nature of the contour of the surface of object 105, fringe pattern 106 is distorted according to the local curvature of the object when observed by an imaging sensor 102. In order to observe the distortion of the fringe pattern, the angle between the pattern projector 101 and the object 105 is different from the angle between the imaging sensor 102 and the object. A control and process unit 104 is used to control and synchronize the light pattern or fringe pattern generated by light pattern projector 101 with the detection by imaging sensor 102. Control and process unit 104 is also used to collect and process the distorted fringe data received by imaging sensor 102, for instance by applying a mathematical model to calculate the 3D coordinates (x, y, z) of any point (e.g., point O1) on the surface of object 105.

In some embodiments, light pattern projector 101 includes a single pair of point sources S1 and S2. In the context of this description, a point source is a light source for which the size of the light intensity at the location of the light source is small compared to the distance between the light pattern projector 101 and the object 105. For instance, the size (e.g., the full width at half max, FWHM) of the light intensity at the point source is about 0.1-10 µm (or 0.1λ-10λ, where λ is the wavelength of the light), and/or at least 100 times less than the distance between light pattern projector 101 and object 105. Point sources S1 and S2 are separated by a fixed distance a, which is, for instance, in the range of 5-500 µm (or 5λ-500λ), or any other value that is relevant to the measurement criteria of a particular application.

Point source S1 generates a first beam 111 of light and point source S2 generates a second beam 112 of light. The two beams 111, 112 are mutually coherent. In some cases, the light intensity at S1 and S2 is equal. As was shown by Tomas Young's double slit experiment, any two coherent beams (e.g., beams 111 and 112) of light from two point sources (S1 and S2) interfere with each other at any given point within their divergent angle of light radiation (e.g., point O1 on the surface of object 105) due to the wave nature of the light. Thus, light pattern projector 101, which includes the point sources S1 and S2, produces an interference light pattern or fringe pattern 106 on the surface of object 105. Fringe pattern 106 has an infinite depth of focus and closely follows the Young's interference formula to infinity with almost no distortion.

Without losing generality, the origin of the coordinate system for measurement apparatus 100 can be set at the midpoint S0 of the two point sources S1, S2. Thus, the point source S1 has the coordinates (−a/2, 0, 0) and the point source S2 has the coordinates (a/2, 0, 0), where a is the separation between S1 and S2. At an arbitrary point on the surface of object 105, the fringe phase φ, which is the phase difference between the two beams 111, 112, is a function of the light wavelength λ, the separation distance a between point sources, and the 3D coordinates (x, y, z) of point O1. According to the Young's interference principle, the fringe phase is given as $$\varphi = \frac{2\pi x}{\sqrt{x^2 + y^2 + z^2}} \frac{a}{\lambda} \quad (1)$$

The profile of the light intensity I of the interfering beams 111, 112 on the surface of object 105 is detected by imaging sensor and used to calculate the coordinates (x, y, z) of point O1. Imaging sensor 102 includes, for instance, a CCD or CMOS imager 121 and a lens system 122. The origin of the CCD or CMOS imager 121 is at C0, and the normal direction vector of the imager 121 is c. The scattered light from arbitrary point O1 on the surface of object 105 is collected by lens 122 and projected on to the surface of imager 121 at a point P1 with imager local coordinates (x', y'). The intensity of the scattered light and the local coordinates (x', y') are recorded by imager 121. Via calibration of the imager 121 and its lens system 122, any distortion induced by lens 122 and/or imager 121 can be corrected. Thus, the corrected intensity recorded by imager 121 can be used to calculate the fringe phase at point O1 on object 105, and the local coordinates (x', y') can be used to calculate a linear projection 113 from point O1 to point P1.

Since both light pattern projector 101 and imaging sensor 102 are rigidly constructed, and the distance vector b, which is drawn between the midpoint S0 of point sources S1 and S2 to the center of the imager or the origin C0 of the local coordinate system of the imager, is known (e.g., by calibration prior to measurement), the coordinates (x, y, z) of point O1 on the surface of object 105 can also be calculated, provided the fringe phase φ at point O1, the imager normal direction vector c, and the projection vector 113 are also known.

Referring to FIG. 1B, an equal-phase plane 107 is a curved plane on which each point has the same fringe phase value φ, which is caused by the light path difference between beam 111 from source S1 and beam 112 from source S2. Since the point O1 is the intersection of the equal-phase plane 107 and the projection vector 113, the coordinates (x, y, z) of point O1 are uniquely determined by knowing the shape of equal-phase plane 107 according to Equation (1), the projection vector 113, the distance vector d, and the imager normal direction vector c.

Referring to FIG. 1C, the fringe phase φ at point O1 on the surface of object 105 can be calculated by knowing the intensity profile of the interfering light. In one embodiment, a phase shifting interferometry (PSI) method is used. In this case, the light intensity that is produced by pattern projector 101 at any point O1, with coordinates (x, y, z), on the surface of object 105, is given as $$I(x,y,z) = I'(x,y,z) + I''(x,y,z)\cos(\phi(x,y,z) + \theta), \quad (2)$$

where I' is the background intensity, I'' is half of the peak-to-valley intensity modulation of fringes 106, φ is the fringe phase, and θ is the initial phase difference between point sources S1 and S2. To solve the three unknowns in Equation (2) (I', I'', and φ), at least three phase shifts of initial phase θ are used. For instance, assuming that there are three initial phases used (θ1=−2π/3, θ2=0, and θ3=2π/3), then the fringe phase φ can be calculated as follows:

$$\varphi = \tan^{-1}\left(\sqrt{3}\,\frac{I_1 - I_3}{2I_2 - I_1 - I_3}\right), \quad (3)$$

where $I_1$, $I_2$, and $I_3$ are the intensities resulting from initial phases θ1, θ2, and θ3, respectively.

The fringe phase calculated from Equation (3) has 2π ambiguity, and a discontinuity occurs every time φ changes by 2π. Fringe phase unwrapping is used to eliminate this ambiguity. Exemplary methods of fringe phase unwrapping include path integration phase unwrapping and spatial coherent phase unwrapping.

Referring to FIG. 1D, in one embodiment, a multi-fringe-wavelength beating strategy is used for phase unwrapping by employing fringe projections with two or more fringe wavelengths. For instance, two different phase maps φ1 and φ2 with two different fringe wavelengths λ1 and λ2, respectively, are superimposed. The superposition produces the phase-correct subtraction of these two functions, yielding the desired beat function $\Delta\phi$ with fringe wavelength $\lambda b$:

$$\lambda_b = \frac{\lambda_1 \lambda_2}{\lambda_1 - \lambda_2}. \quad (4)$$

FIG. 1D shows two phase maps with initial fringe wavelengths selected to obtain an unambiguous beating function. To unwrap a large number of phase periods to cover the whole measurement field of view and/or to reduce unwrapping error, phase maps with three or more fringe wavelengths can also be used.

According to Equation (1), the fringe wavelength is inversely proportional to the separation distance between the two point sources and proportional to the wavelength of the light. For a single pair Young's double-point interference light pattern projector, different fringe wavelengths can be generated using multiple light wavelengths from the same point sources. Alternatively, fringe wavelength can be changed by using multiple fringe projectors with a different separation distance between the point sources in each pair.

Figure 2:
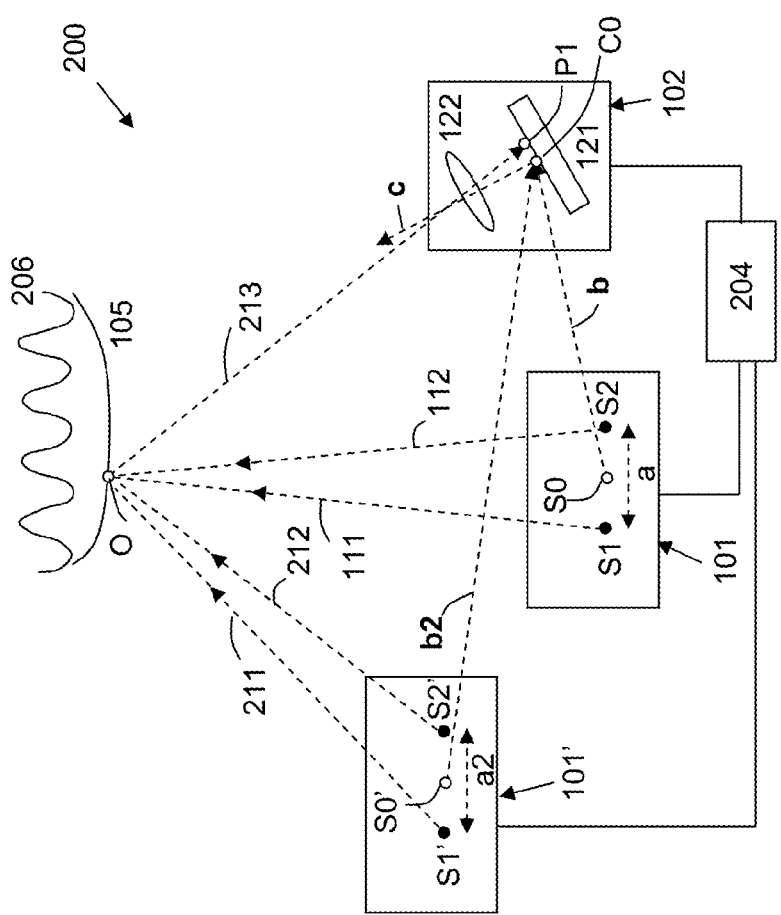
FIG. 2 is a block diagram of a 3D imaging system.

Referring to FIG. 2, in one embodiment of a shape measurement apparatus 200, two or more pattern projectors 101, 101' are used both to facilitate fringe phase unwrapping by using the multiple-fringe-wavelength scheme shown in FIG. 1D and, in some cases, to perform additional measurements to improve the accuracy of the system. Pattern generators 101, 101' each project a fringe pattern 206 onto the surface of object 105. The fringe pattern 206 is distorted when observed by imaging sensor 102. A control and process unit 204 is used to control and synchronize the fringe pattern generated by pattern projectors 101, 101' with the detection by imaging sensor 102 and to collect and process the distorted fringe data received by imaging sensor 102.

As discussed above, pattern projector 101 includes point sources S1 and S2 separated by distance a. The point sources generate first and second mutually coherent beams 111, 112 of light that are incident on the surface of object 105 at point O1. The distance vector b represents the separation between the midpoint S0 between point sources S1, S2 and the center of imager 102. Similarly, pattern projector 101' includes point sources S1' and S2' separated by distance a2. Point sources S1' and S2' generate first and second mutually coherent beams 211, 212 of light that are also incident at point O1 on the surface of object 105. A distance vector b2 represents the separation between the midpoint S0' between point sources S1', S2' and the center of imager 102. A linear projection 213 can be calculated from point O1 to point P1 in imager 102.

With two fringe wavelength pattern projectors, two triangulation measurement systems are formed with imaging sensor 102, one system involving pattern projector 101 and a second system involving pattern projector 101'. Thus, a second set of 3D measurement data is generated and can be used to improve the accuracy and/or resolution of the measurements of shape measurement apparatus 200, in addition to unwrapping fringe phase by multiple-fringe-wavelength scheme.

2 3D Imaging System

Figure 7:
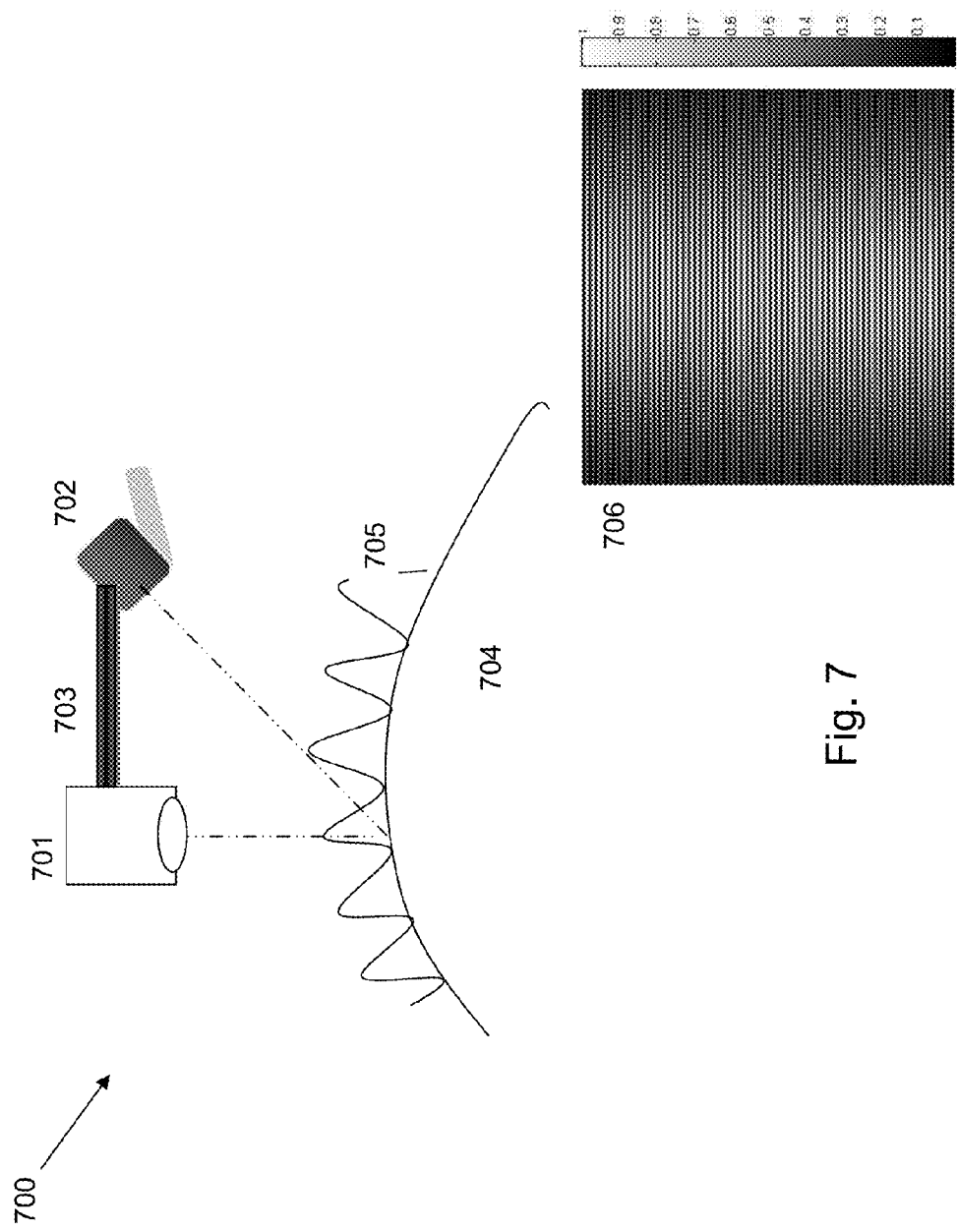
FIG. 7 is a block diagram of a 3D imaging system.

Referring to FIG. 7, a 3D imaging system 700 includes a fringe projector 702, such as the fringe projector described above. A base 703 rigidly connects fringe projector 702 to a camera 701. The base is made of a metal, such as aluminum or Invar®, or another material, such as carbon fiber.

Fringe projector 702 projects fringes 705 onto an object 704. The fringes are also shown in an image 706. Fringe projector 702 induces at least three different phase shifts (e.g., 0, 120, and 240 degrees) to enable phase shift interferometry (PSI) measurements. Camera 701 captures images of the fringes for each phase shift and saves the images for later calculations of the shape of object 704 by a data analysis module (not shown).

3D imaging system 700 is based on triangulation. That is, the phase of the fringes 705 on the surface of the object 704 is proportional to the angle between the fringe projector 702 and a point on the object 704. Thus, measurement of the phase of the fringes is equivalent to determining the angle between the base 703 and a beam of light at a point on the object. Second and third triangulation angles can be determined by knowing the pixel on the camera sensor, which may be a CCD or a CMOS image sensor. Extensive calibration is preferably performed on the camera in order to correct the triangulation angles.

Figure 8:
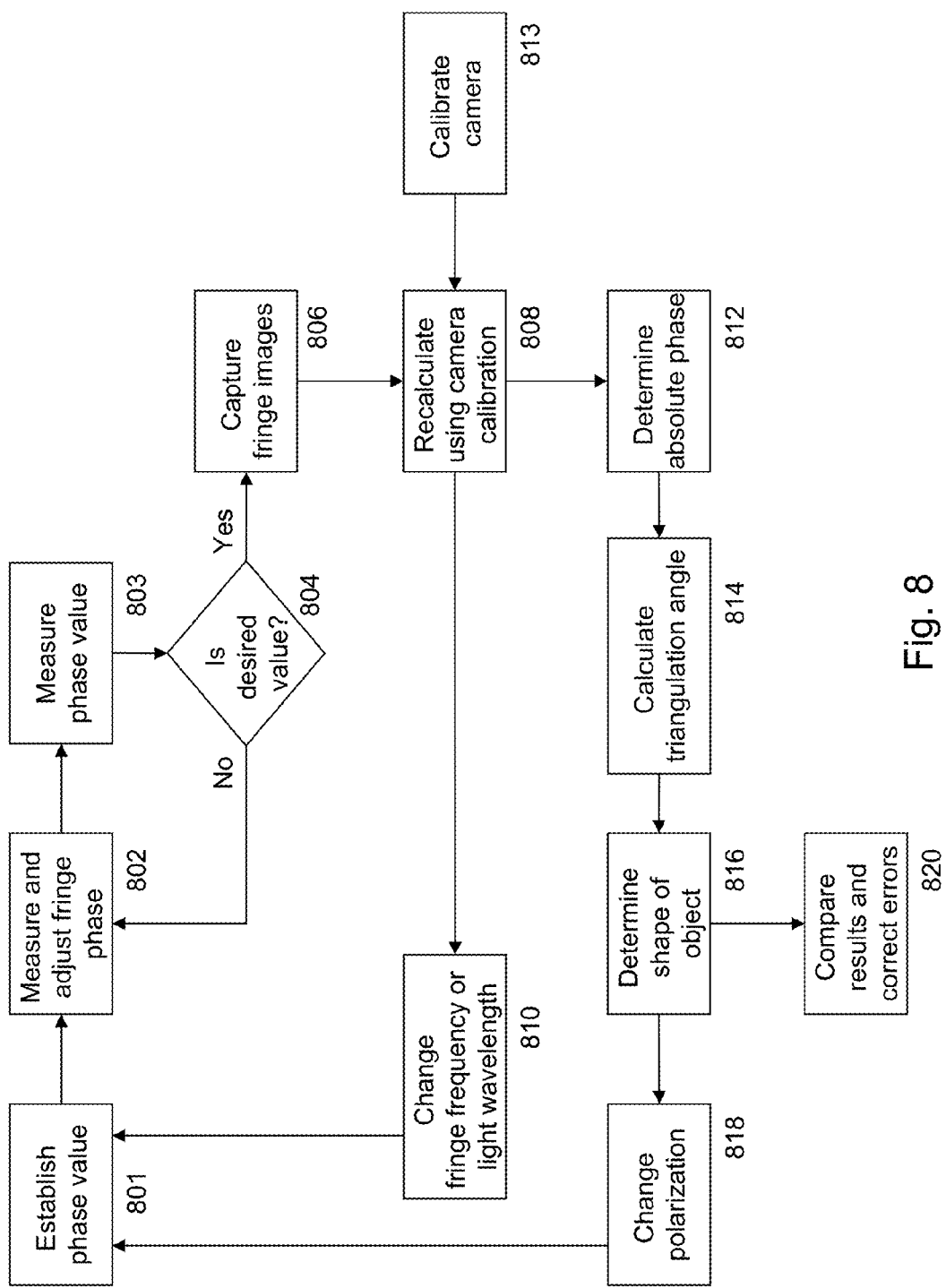
FIG. 8 is a flow chart for 3D imaging.

Referring to FIG. 8, in a 3D imaging system, the phase value of the fringe projector is established (e.g., by setting the voltage or current to an active waveguide in the fringe generator, as discussed below; step 801). The generated fringe phase is measured and adjusted if necessary (step 802). The phase value is measured (step 803) and compared to the desired value (step 804). If the phase value is incorrect, precise adjustments are performed to bring the measured value into agreement with the desired value (step 802). If the phase value is correct, images of the fringes are captured by the camera for multiple fringe phases produced by the projector (step 806). If necessary, the camera is calibrated (step 813) and the image is recalculated using the new camera calibration (step 808). The above steps are then repeated for a different fringe frequency or light wavelength (step 810).

Phase unwrapping algorithms are performed to determine the absolute phase of the fringes (step 812) and the triangulation angle on the camera side is calculated using the camera calibration (step 814). Using the results, the shape of the object can be determined (step 816). In some cases, another set of measurements may be performed using light with a different polarization (step 818), after which the shape of the object is recalculated, compared with the previously determined shape, and used to correct for any errors in the measurement (step 820).

3 On-Chip Fringe Projector

In general, in a microchip-based fringe projector, the pair of point sources (i.e., point sources S1 and S2 of FIG. 1A) is formed by the end facets of two optical waveguides fabricated on a wafer that is processed by micro-fabrication technology. Additionally, in general, a fringe phase shifter in a microchip-based fringe projector is also fabricated on a wafer that is processed by micro-fabrication technology.

Figure 3:
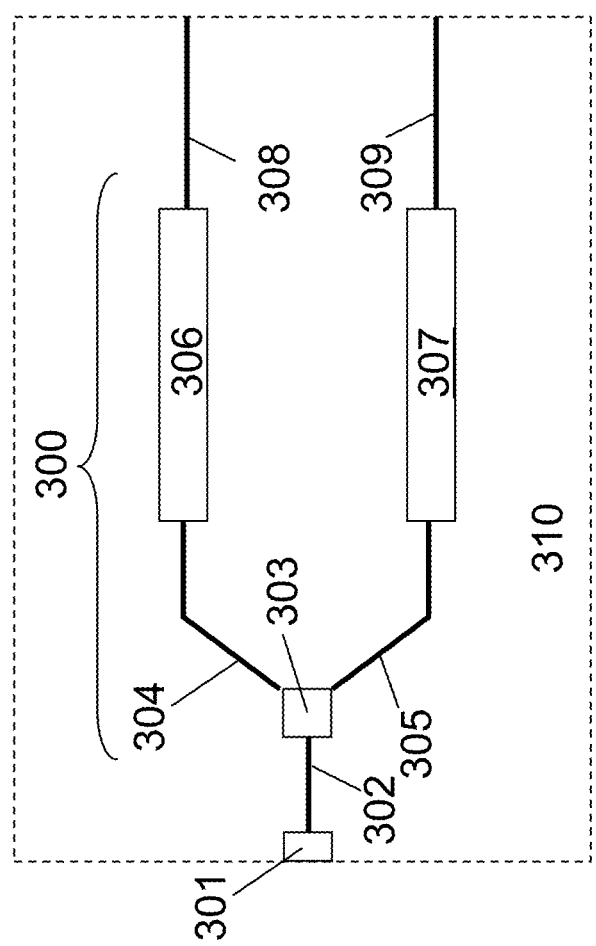
FIG. 3 is a schematic diagram of a fringe projector.

Referring to FIG. 3, a fringe projector chip 310 includes a phase shifter 300 (including at least 3 dB splitter 303 and active waveguides 306 and 307) capable of generating fringes with continuously variable phase and infinite depth of focus. Fringe projector chip 310 is also able to product various fringe frequencies spaced at a different distance between two output waveguides 308 and 309.

Chip 310 is formed from a wafer processed by micro-fabrication technology. For instance, the micro-fabrication technologies may include fabrication processes such as material epitaxy growth or deposition, photolithography, etching, doping, implantation, oxidation, metal deposition, sputtering, and other processes. Available micro-fabrication technology platforms include platforms such as complementary metal-oxide-silicon (CMOS) technology, BiCMOS technology, SiGe technology, GaAs/GaN/InP III-V semiconductor technology, and glass/quartz/crystal/polymer micro-fabrication technology platforms. The wafer may be, for instance, a Si wafer, a silicon-on-insulator (SOI) wafer, a silicon-on-quartz (SOQ) wafer, a GaAs wafer, an InP wafer, a GaN wafer, a sapphire wafer, a quartz wafer, a LiNbO$_3$ wafer, or any other type of wafer suitable for micro-fabrication.

3.1 Active Phase Shifter

Fringe projector chip 310 includes a light-to-waveguide coupler 301 that receives incident coherent light from a light source (not shown). The incident coherent light is provided by a laser, such as a semiconductor diode laser, a solid state laser, a gas laser, or a fiber laser, or a coherent LED (light emitting diode) or SLED (superluminescent light emitting diode). The wavelength of the incident light may be any wavelength that is relevant to the desired 3D shape measurement application, and may be any of visible light, infrared light, or ultraviolet light. The light passes through an input optical waveguide 302 and into 3 dB beam splitter 303. In some embodiments, beam splitter 303 is another type of beam splitter, as dictated by design considerations. Beam splitter 303 divides the light into two beams, each with the same phase, polarization, and amplitude. Beam splitter 303 may be, for instance, a Y splitter, a multimode interference (MMI) splitter, or a directional coupler splitter. The facet of chip 310 on which the input to waveguide 302 resides may be coated with an anti-reflection (AR) coating to reduce reflection.

The first beam of light travels along a passive waveguide 304, passes through active waveguide 306, and travels along passive output waveguide 308. The second beam of light travels along a passive waveguide 305, passes through active waveguide 307, and travels along passive output waveguide 309. The light from output waveguides 308 and 309, which are separated by a distance d, is emitted directly from chip 310 and travels through free space (or another environment) to a target object. The wafer facet from which the light is emitted may be coated with an AR coating to reduce reflection. The two waveguide outputs thus form the two point sources used for the Young's double-point fringe projector described above.

Each active waveguide 306, 307 applies a controllable phase shift to the light. In some embodiments, only a single arm generates a phase shift. For instance, only one active waveguide may be used while the other active waveguide acts as a passive waveguide. Alternatively, one active waveguide (e.g., active waveguide 307) is eliminated and replaced by an additional passive waveguide. In other embodiments, in a differential arm phase shift scheme, each active waveguide 306, 307 is used to generate a different phase shift for each light beam.

The phase changes in active waveguides 306, 307 are due to the refractive index changes of one or both active waveguides. The refractive index changes are induced by the application of controllable electric power into one (in the single arm phase shift embodiments) or both (in the differential arm phase shift embodiments) active waveguides. For instance, in a single arm phase shift scheme, an electric power is applied to active waveguide 306, creating a refractive index change in waveguide 306 relative to the refractive index of waveguide 307 (which, in this case, acts as a passive waveguide). Thus, when a first light beam travels along the top arm of phase shifter 300 and a second light beam travels along the bottom arm, the two light beams are output from passive waveguides 308, 309, respectively, with the same amplitude, the same polarization, and with their coherence retained, but with a different phase due to the difference in refractive index between active waveguides 306 and 307. Because the distance d between the output waveguides 308 and 309 can be precisely controlled during the fabrication of phase shifter 300, allowing a desired spatial fringe frequency to be produced, the two coherent but phase shifted light beams can be used in phase shift interferometry (PSI) and fringe projection technologies.

In some instances, the on-chip light-to-waveguide coupler 301 is not present. However, a well-designed coupler 301 reduces the loss of laser power upon receipt of the incident light.

The optical waveguides in chip 310 may be any type of waveguide, such as a channel waveguide, ridge waveguide, rib waveguide, buried waveguide, a slot waveguide, or a photonic crystal waveguide. For instance, referring to FIG. 4A, an exemplary channel waveguide 401 is shown; a dashed line 402 shows the profile of a light beam confined within channel waveguide 401. Alternatively, referring to FIG. 4B, an exemplary ridge waveguide 403 is shown; a dashed line 404 shows the profile of a light beam confined within ridge waveguide 403.

The core of channel waveguide 401 or ridge waveguide 403 is formed of a material that has a refractive index higher than that of the surrounding cladding materials. The waveguide core may be formed of any dielectric material that is suitable for the particular wavelength and application. The waveguide core may be crystalline or non-crystalline. For instance, the waveguide core may be formed of Si; amorphous Si; Ge; any III-V or II-VI semiconductor such as GaAs, InP, GaP, InP, InAs, GaN, AlN, InN, or any combination thereof; $Si_xN_y$, $Si_xO_y$; $Si_xON_y$; $Ti_xO_y$; or LiNbO$_3$ or LiTaO$_3$ crystals. Alternatively, the waveguide core may be made of an organic thin film polymer prepared by the mixing of nonlinear optical chromophore molecules. The waveguide core material may also be any combination of applicable dielectric materials or any combination of composition of such materials. In other embodiments, the waveguides are formed by intentional impurity doping rather than by geometric shaping.

The waveguide cladding may be air or any dielectric material that is suitable for the particular wavelength and application. The cladding may be crystalline or non-crystalline. For instance, the cladding may be formed of GaAs, InP, GaP, InP, InAs, GaN, AlN, InN, or any combination thereof; $Si_xN_y$, $Si_xO_y$; $Si_xON_y$; $Ti_xO_y$; LiNbO$_3$ or LiTaO$_3$ crystals; or organic thin film polymers. The cladding material may also be any combination of applicable dielectric materials or any combination of composition of such materials.

The specific refractive index for the waveguide core and cladding material is chosen based on the specific wavelength and application of phase shifter 300. In general, the core has a higher refractive index than the cladding. In some embodiments, the refractive index difference between core and cladding is greater than about 0.1. For instance, a waveguide can be formed with a core of $Si_3N_4$, which has an index of about 2 in the red color visible light wavelength; and an $SiO_2$ cladding, which has an index of about 1.45 in the red color visible light wavelength. A single mode channel waveguide formed with these materials can be quite small (e.g. in the range of about 200-400 nm) for visible light wavelengths. However, the single mode size of the waveguide can be, for instance, between about 100 nm-10 µm, or any other size that is applicable to a specific application. The waveguides can be either single mode or multimode waveguides.

Active waveguides 306, 307 may be formed from any type of material that experiences an electric power induced refractive index shift, directly or indirectly. After the application of an electric power to the active waveguide, the refractive index shift may be caused by, for instance, an electro-optic effect, in which the refractive index of the material is changed by the application of an electric field; a thermo-optic effect, in which the refractive index of the material is changed due to a temperature change induced by the application of the electric power; or an acoustic-optic effect.

In one embodiment, an electric powered thermal phase shifter is used to locally heat the active waveguide, causing a temperature change in the active waveguide. Due to the thermo-optic effect, the change in temperature induces a change in refractive index. Local heating of one arm of a fringe projector will create an index difference between the two arms of the fringe projector, resulting in a phase difference between the light output from each of the two arms. The heater used in a thermal phase shifter may be any type of resistance heater, such as a metal heater, a silicide heater, or a doped semiconductor heater, and is operated by applying an electric voltage or current.

Referring to FIG. 5A, in one instance, an active channel waveguide 502 embedded in a cladding material (not shown) is heated by a metal strip 503. Upon the application of a voltage, the metal strip 503 acts as a local heater, elevating the temperature of channel waveguide 502 and inducing an index change in the waveguide. As another example, referring to FIG. 5B, two electrical contacts 506, 507 are positioned on both sides of a ridge waveguide 505 such that a voltage can be applied across the ridge waveguide. When the ridge waveguide is made from a semiconductor material and is properly doped, the waveguide acts as a resistive heater.

Referring again to FIG. 3, the active waveguides 306, 307 may be formed from any material that is relevant to the particular application of phase shifter 300 and may be formed from the same material or different material from other waveguides on chip 310. For good phase shifting and control performance, materials exhibiting a strong electro-optic effect, such as LiNbO$_3$, GaAs, or GaN; thermo-optic effect, such as Si; or acoustic-optic effect, such as LiNbO$_3$, may be used.

In some embodiments, chip 310 may be in contact with a temperature control system such as a thermal electrical cooler (TEC), which acts as a global heat sink, stabilizing the temperature of chip 310. Active waveguides 306, 307 may create localized hot spots that can be stabilized by such a global heat sink.

3.2 Delay line phase shifter

Figure 6:
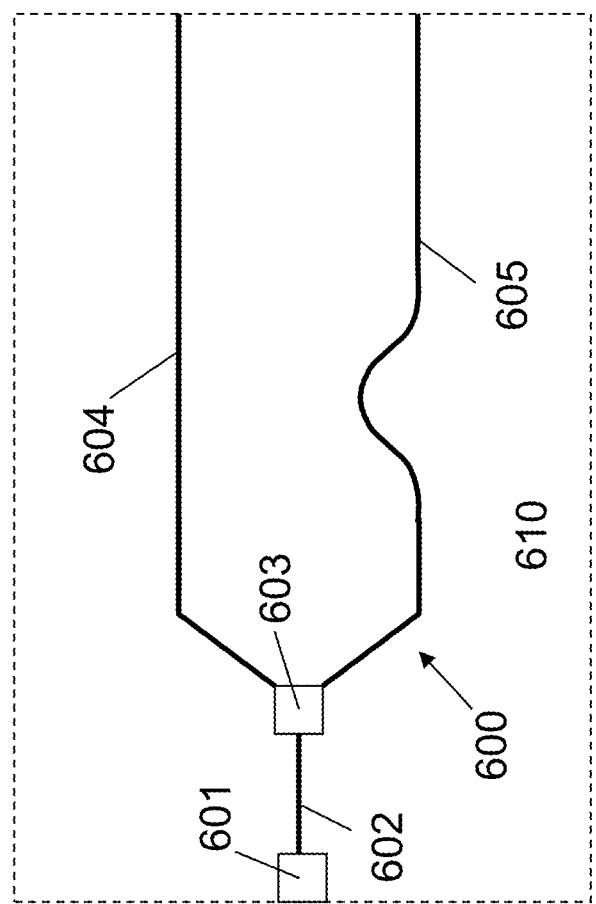
FIG. 6 is a schematic diagram of a delay line fringe projector.

Referring to FIG. 6, in one embodiment, a fringe projector chip 610 includes a delay-line phase shifter 600. Fringe projector chip 610 includes a light-to-waveguide coupler 601 that receives incident coherent light from a light source, such as a laser (not shown). The light passes through an input optical waveguide 602 and into a 3 dB beam splitter 603. Beam splitter 603 divides the light into two beams, each with the same phase, polarization, and amplitude. The first beam of light travels along a first passive optical waveguide 604; the second beam of light travels along a second passive optical waveguide 605. Optical waveguides 604 and 605 have different lengths.

While traveling along waveguides 604, 605, each beam experiences a different phase change due to the difference in length of the two waveguides. For instance, for a length $L_1$ of waveguide 604, a length $L_2$ of waveguide 605, a free space wavelength of the light of $\lambda_0$, a chip temperature of T, and an effective index of the two waveguides of n, the fractional wave numbers that the beams travel along waveguides 604, 605 after beam splitter 603 are, respectively:

$$m_1 = \frac{nL_1}{\lambda_0} \quad (5)$$

$$m_2 = \frac{nL_2}{\lambda_0}$$

$$\Delta m = m_1 - m_2 = \frac{n(L_1 - L_2)}{\lambda_0} = \frac{n\Delta L}{\lambda_0},$$

where $m_1$ and $m_2$ are real numbers. Without losing generality, it is safe to assume that $\Delta m$ is an integer number at the current temperature T, meaning that the phase difference between the two light beams is zero due to the periodic nature of the light wave.

Now, assume that the chip temperature is changed to T'. Due to the thermo-optic effect, the effective refractive index of the two waveguide arms is changed to n'. Thus, the wave numbers of the two light beams after beam splitter 603 become, respectively, $$m_1' = \frac{n'L_1}{\lambda_0} \quad (6)$$

$$m_2' = \frac{n'L_2}{\lambda_0}$$

$$\Delta m' = m_1' - m_2' = \frac{n'(L_1 - L_2)}{\lambda_0} = \frac{n'\Delta L}{\lambda_0},$$

and $\Delta m' - \Delta m = \frac{n'\Delta L}{\lambda_0} - \frac{n\Delta L}{\lambda_0} = \Delta n \frac{\Delta L}{\lambda_0}.$ Since $\Delta L$ is fixed by the micro-fabrication process and $\lambda_0$ is fixed by the light source, the phase difference between the two light beams is fully controlled by $\Delta n$, which is in turn caused by the thermo-optic effect. Thus, when light travels along waveguides 604 and 605, the two beams of light emerge from chip 600 as coherent light with the same amplitude and the same polarization but with different phase due to this refractive index difference.

4 Multiple Phase Shifters

In some embodiments, multiple phase shifters are located on each chip, with an on-off switch associated with each phase shifter. In some cases, each phase shifter has a preset phase shift (e.g., 0, 120, and 240 degrees). If a single phase shifter were used, rapidly and accurately switching that phase shifter from one stable phase setting to the next would pose a challenge for the phase feedback control system, which would control both the stability of the phase setpoint and the ramping from one setting to the next. With each phase shifter dedicated to one single phase shift, the complexity of the phase feedback control system can be reduced, as the feedback controls only the stability of the setpoint.

Alternatively, each of the multiple phase shifters is associated with a different wavelength of light. Having a dedicated phase shifter for each wavelength facilitates measurement, reduces error, and eases post-measurement phase unwrapping calculations.

Figure 9:
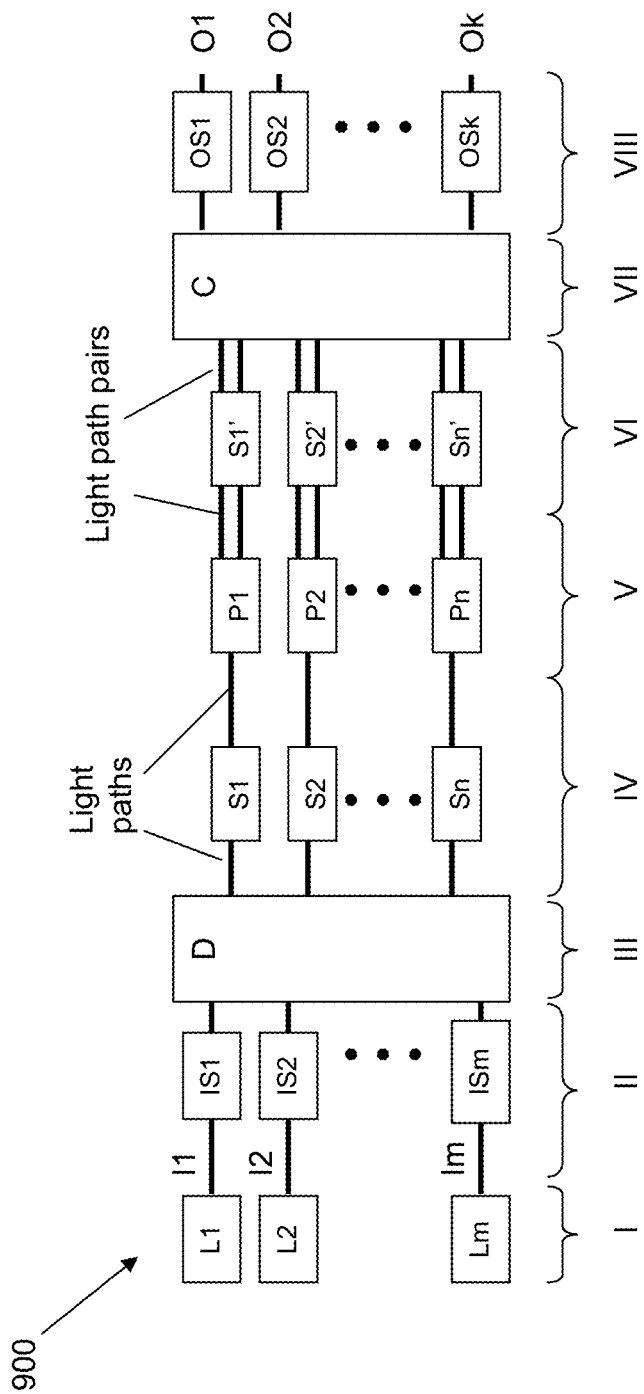
FIG. 9 is a block diagram of a fringe projector including multiple phase shifters.

Referring to FIG. 9, a fringe projector 900 including multiple phase shifters P1 . . . Pn receives light from multiple coherent light sources L1 . . . Lm (function block I; m≥1). The coherent light sources can be any type of laser, such as a semiconductor diode laser, a solid state laser, a gas laser, and a fiber laser, or any type of light emitting diode or superluminescent light emitting diode. The wavelength of light can be any wavelength that is relevant to the desired application of fringe projector 900, such as visible light, infrared light, or ultraviolet light. In some embodiments, function block I resides on the same chip as fringe projector 900, such as in a fully integrated fringe projector chip. In other embodiments, function block I is constructed on a separate micro-chip. Alternatively, function block I may be built as a free space optical system that may or may not include optical lenses, or may be built as a fiber optical system.

The coherent light from the light sources takes paths I1 . . . Im (function block II) into the fringe projector 900. The wavelength, intensity, phase, and/or polarization of light in each input path is independent from that in the other input paths. Each light input path may have an on-off optical switch IS1 . . . ISm to allow or prohibit the light from passing through the path. In addition or instead of an on-off switch, each path may have a variable optical attenuator (VOA) to adjust the intensity of the light in the path in a continuous range from the maximum light intensity (equal to the output intensity of the light source) to zero. In some embodiments, function block II resides on the same chip as fringe projector 900; in other embodiments, function block II is constructed on a separate microchip. Alternatively, function block II may be built as a free space optical system that may or may not include optical lenses, or may be built as a fiber optical system. The on-off switches and/or VOAs may be any of a variety of devices. For instance, when the input light paths are built by free space lens optics, a step motor driven optical shutter may be used as an on-off switch. As another example, when the input light paths are formed on a semiconductor wafer, a VOA using a PIN semiconductor diode may be used. If the input light paths include on-off switches and/or VOAs, function block II is considered to be an active function block, in which external control is used to operate components of the function block.

Function block III includes a light source distributor (D), which delivers light from any one of the input light paths I1 . . . Im to one or more fringe projector phase shifter light paths. That is, function block III connects m input light paths, where m≥1, and n phase shifter light paths, where n≥m. In some embodiments, function block III resides on the same chip as fringe projector 900; in other embodiments, function block III is constructed on a separate microchip. Alternatively, function block III may be built as a free space optical system that may or may not include optical lenses, or may be built as a fiber optical system.

Figure 10A:
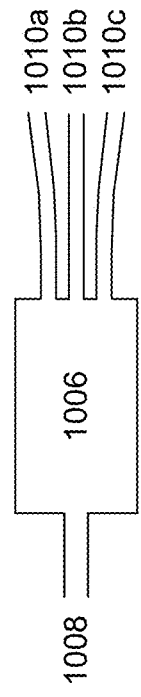
FIGS. 10A-10D are schematic diagrams of light source distributors.
Figure 10B:
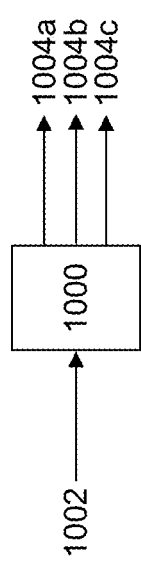

Referring to FIG. 10A, in one embodiment of function block III, a distributor 1000 simultaneously divides the input light 1002 into one or more outputs 1004a, 1004b, 1004c, generally each with equal intensity. Distributor 1000 is generally a passive component that does not require external control. For instance, referring to FIG. 10B, when used with waveguide optics, one example of a distributor 1000 is a multimode interference (MMI) type 1-to-3 splitter 1006 used to divide light from one input waveguide 1008 into three output waveguides 1010a, 1010b, 1010c simultaneously.

Figure 10C:
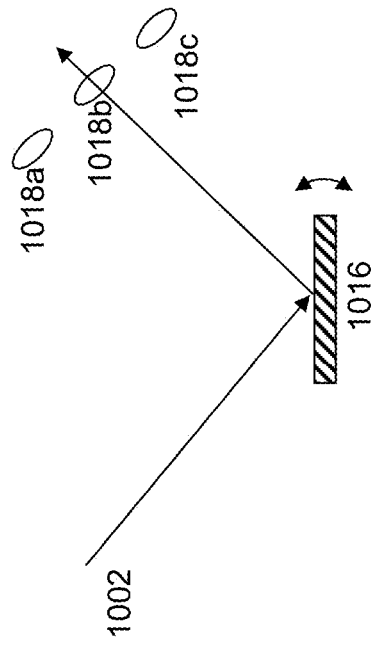
Figure 10D:
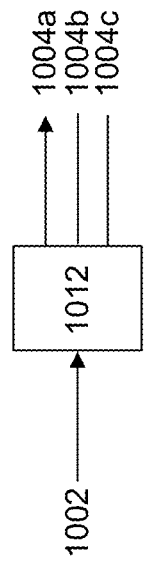

Referring to FIG. 10C, in a second embodiment of function block III, the input light 1002 can be directed into only one of multiple outputs 1004a, 1004b, 1004c at a time by a distributor 1012. Distributor 1012 is an active component controlled by an external control (not shown) and does not deliver light to multiple paths simultaneously. For instance, referring to FIG. 10D, in free space optics, a step motor driven optical mirror 1016 is rotated to reflect input light 1002 to one of the three output lenses 1018a, 1018b, 1018c (in this case, to lens 1018b), and thus to deliver the light to the corresponding light path.

Referring again to FIG. 9, the distributed light arrives at function block IV, which may include one or more of on/off switches S1 . . . Sn and/or a VOA array. Function block IV turns the light on or off, in the case of switches, or adjusts the intensity of the light, in the case of VOAs. In some embodiments, function block IV resides on the same chip as fringe projector 900; in other embodiments, function block IV is constructed on a separate microchip. Alternatively, function block IV may be built as a free space optical system that may or may not include optical lenses, or may be built as a fiber optical system. The on-off switches and/or VOAs may be any of a variety of devices. For instance, when the input light paths are built by free space lens optics, a step motor driven optical shutter may be used as an on-off switch. As another example, when the input light paths are formed on a semiconductor wafer, a VOA using a PIN semiconductor diode may be used. Because an on-off switch and/or a VOA require external control, function block IV is an active function block.

Each light path then proceeds to the phase shifter array P1 . . . Pn (function block V). Each phase shifter has a structure equivalent to the phase shifter described in FIG. 3. Any one of the phase shifters P1 . . . Pn can be used as a static phase shifter (whose phase is fixed at some value) or a as dynamic phase shifter (whose phase is ramped to and stabilize at phase values consecutively according to measurement criteria, for example to achieve a sequential PSI measurement). Function block V is formed on a fringe projector micro-chip and is an active function block.

After passing the phase shifter array, the light proceeds to function block VI, which may include post-phase shifter on-off switches S1' . . . Sn' and/or VOAs. In some embodiments, function block VI resides on the same chip as fringe projector 900; in other embodiments, function block VI is constructed on a separate microchip. Alternatively, function block VI may be built as a free space optical system that may or may not include optical lenses, or may be built as a fiber optical system. The on-off switches and/or VOAs may be any of a variety of devices, as described above in conjunction with function block VI. Each phase shifter in function block V has two output light paths; the on-off switch and/or VOA corresponding to each phase shifter may be used for either or both light paths. Function block VI is an active function block.

Function block VII combines and/or redirects light paths coming from one or more of n phase shifters to k fringe projector output paths, where k≤n. In some embodiments, function block VII resides on the same chip as fringe projector 900; in other embodiments, function block VII is constructed on a separate microchip. Alternatively, function block VII may be built as a free space optical system that may or may not include optical lenses, or may be built as a fiber optical system.

Referring to FIG. 11A, in one embodiment of function block VII, a passive combiner 1100 simultaneously combines one or more input light paths 1102a, 1102b, 1102c into a single output light path 1104. For instance, referring to FIG. 11B, for waveguide optics, an MMI type 3-to-1 wavelength multiplexer 1106 combines light at three different wavelengths from three input waveguides 1108a, 1108b, 1108c into a single output waveguide 1110. Combiner 1100 is generally used to combine light that has different wavelengths or polarizations.

Referring to FIG. 11C, in another embodiment of function block VII, an active combiner 1112 transfers light from only one of the input light paths 1102a, 1102b, 1102c into the output light path 1104. Combiner 1112 does not simultaneously accept light from multiple input light paths. In some cases, light may be present on all of the input light paths; in other cases, light is present on only some of the input light paths. Combiner 1112 is controlled by external control, which selects the input light path. For instance, referring to FIG. 11D, for free space optics, a step motor driven optical mirror 1116 is rotated to reflect one of the input light beams (in this case, light beam 1102b) to an output lens 1118 and thus to deliver that light beam to the output light path.

Figure 11E:
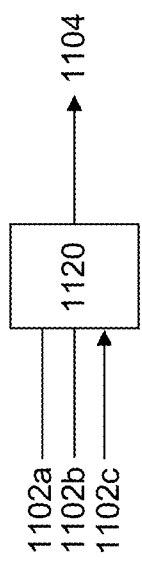
Figure 11F:
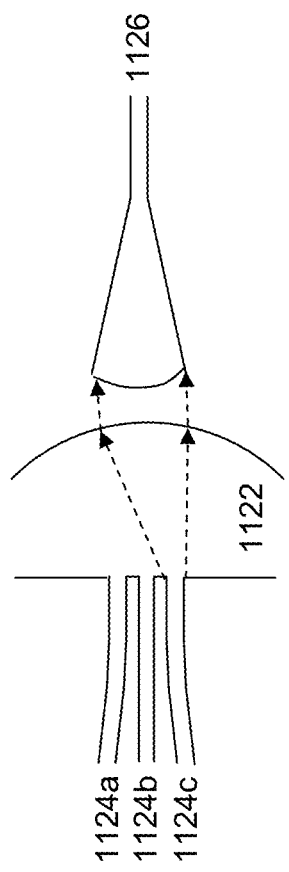

Referring to FIG. 11E, in a further embodiment of function block VII, a passive combiner 1120 transfers light from only one of the input light paths 1102a, 1102b, 1102c into the output light path 1104. Combiner 1120 does not simultaneously accept light from multiple input light paths. Combiner 1120 can only function when on-off switches are used in one or more previous function blocks such that light exists in only one of the input light paths. For instance, referring to FIG. 11F, a 3-to-1 waveguide lens 1122 focuses light from any one of three input waveguides 1124a, 1124b, 1124c into a single output waveguide 1126. The specific input light that is passed into the output waveguide is determined by the on-off switch state in previous function blocks.

Referring again to FIG. 9, in function block VIII, the output light paths OS1 ... OSk (k≥1) output coherent light path pairs leaving the fringe projector 900. The output light paths maintain a set separation for each fringe projection light path pair, which determines the spatial frequency of the fringe projection. Function block VIII may include on-off switches and/or VOAs for each fringe projection light path pair. In some embodiments, function block VIII resides on the same chip as fringe projector 900; in other embodiments, function block VIII is constructed on a separate microchip. Alternatively, function block VIII may be built as a free space optical system that may or may not include optical lenses, or may be built as a fiber optical system. The on-off switches and/or VOAs may be any of a variety of devices, as described above in conjunction with function block VI. If on-off switches and/or VOAs are used, function block VIII is an active function block.

4.1 Multiple Phase Shifters for Fringe Projection

Figure 12:
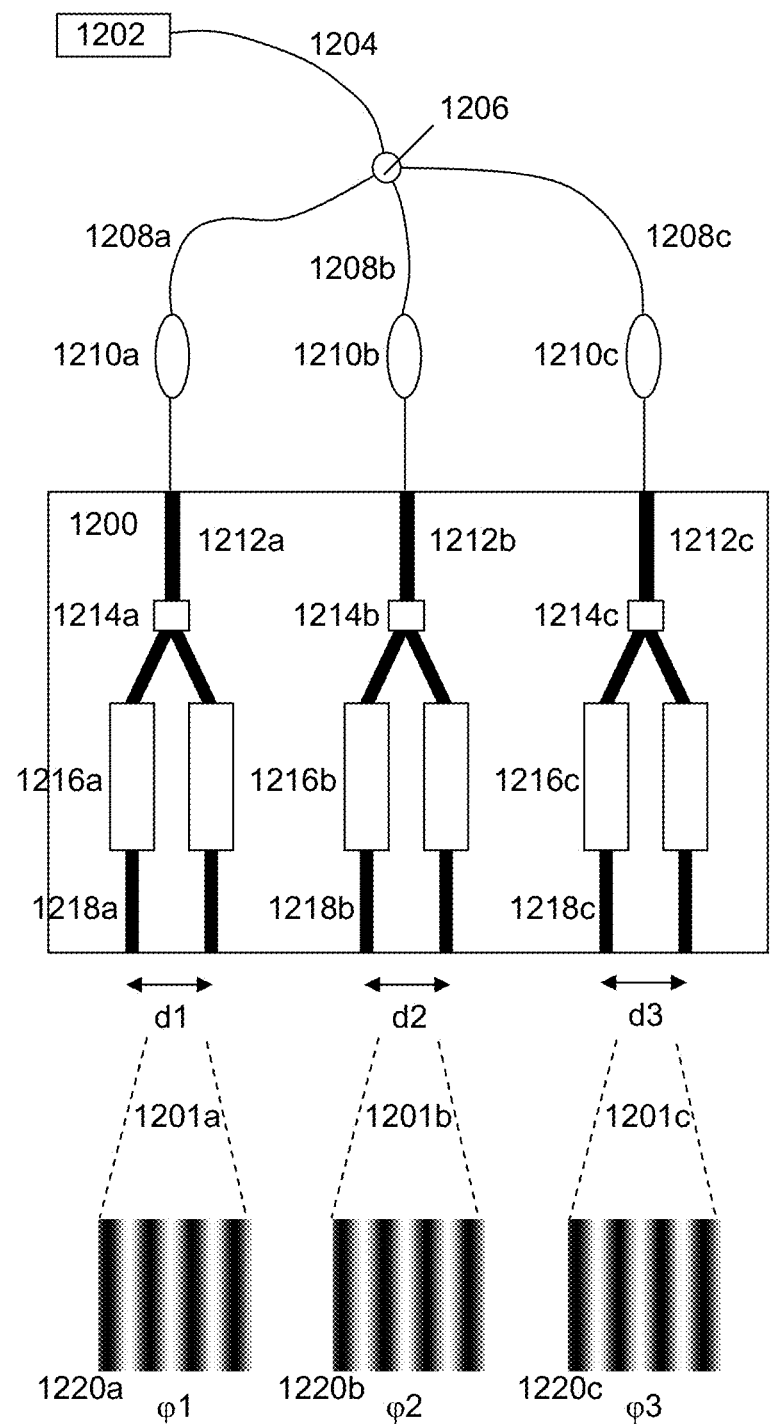
FIG. 12 is a schematic diagram of a fringe projector chip including multiple phase shifters.

Referring to FIG. 12, in one embodiment, a fringe projector chip 1200 generates three phase projections 1201a, 1201b, 1201c with different fringe frequencies. A laser diode light source 1202 is attached to a single mode optical fiber 1204. The light in optical fiber 1204 is divided equally by a fiber-based 1-to-3 splitter 1206 into three phase shifter channels 1208a, 1208b, 1208c. On each phase shifter channel, there is a fiber-based on-off switch 1210a, 1210b, 1210c to turn on or off the light passing through the channel.

The three phase shifter channels are coupled into fringe projector chip 1200 through on-chip fiber-to-waveguide couplers 1212a, 1212b, 1212c, which reduce optical loss. On the fringe projector chip, there are three 3 dB splitters 1214a, 1214b, 1214c, each of which splits the incoming light into two paths. Each pair of incoming light paths is received by a phase shifter active waveguide 1216a, 1216b, 1216c. The phase shifted light is output from each phase shifter through an output waveguide pair 1218a, 1218b, 1218c. The two waveguides in each output waveguide pair are separated by a different distance dn (where n=1, 2, 3, and d1≠d2≠d3). That is, fringe projector chip 1200 includes three output waveguide pairs in parallel that output light on the chip edge and thus are able to produce three fringe patterns 1220a, 1220b, 1220c, each pattern with a different fringe frequency. This configuration is equivalent to having three fringe pattern projectors capable of dynamic phase shifting located on a single chip 1200. Thus, fringe projector chip 1200 can be used as three separate and independent fringe projectors for 3D measurement and also to unwrap the fringe phases as described above with reference to FIG. 1D.

Referring still to FIG. 12, in another embodiment, fringe projector chip 1200 can also be configured such that the two waveguides in each output waveguide pair 1218a, 1218b, 1218c are separated by the same distance d (where d1=d2=d3=d). That is, fringe projector chip 1200 includes three output waveguide pairs in parallel that output light on the chip edge and produce three fringe patterns 1220a, 1220b, 1220c, each pattern with the same fringe frequency.

In this embodiment, the three phase shifter active waveguides 1216a, 1216b, 1216c are each initially ramped to and stabilized at a different phase value. For instance, phase shifter active waveguide 1216a may produce a phase difference $\Delta\theta_1$ of 0 degrees between the light in one output waveguide and the light in the second output waveguide. Phase shifter active waveguide 1216b may produce a phase difference $\Delta\theta_2$ of 120 degrees, and phase shifter active waveguides 1216c may produce a phase difference $\Delta\theta_3$ of 240 degrees. Fiber-based on-off switches 1210a, 1210b, 1210c can be alternately turned on or off as appropriate to allow only one output waveguide pair at a time to generate a fringe pattern.

The use of three separate phase shifters, each phase shifter dedicated to generating a particular phase difference, has a number of advantages over using a single phase shifter to consecutively generate several phase differences. With dedicated phase shifters, the need to ramp and stabilize a single phase shifter at each phase difference with high speed and high precision is eliminated. For instance, in order to satisfy a particular measurement criterion, a single phase shifter may be asked to ramp from a 0 degree phase difference to a 120 degree phase difference within tens of milliseconds and to settle at the 120 degree phase difference with a precision of ±0.1 degree. The feedback control to achieve such a goal may be complex. In contrast, by using multiple phase shifters, there is no need to ramp between consecutive phase differences; the generation of consecutive phase differences is performed by the on-off switches. In this case, the feedback control can focus on the simpler task of maintaining the appropriate precision. Thus, high speed and high precision control are achievable.

Figure 13:
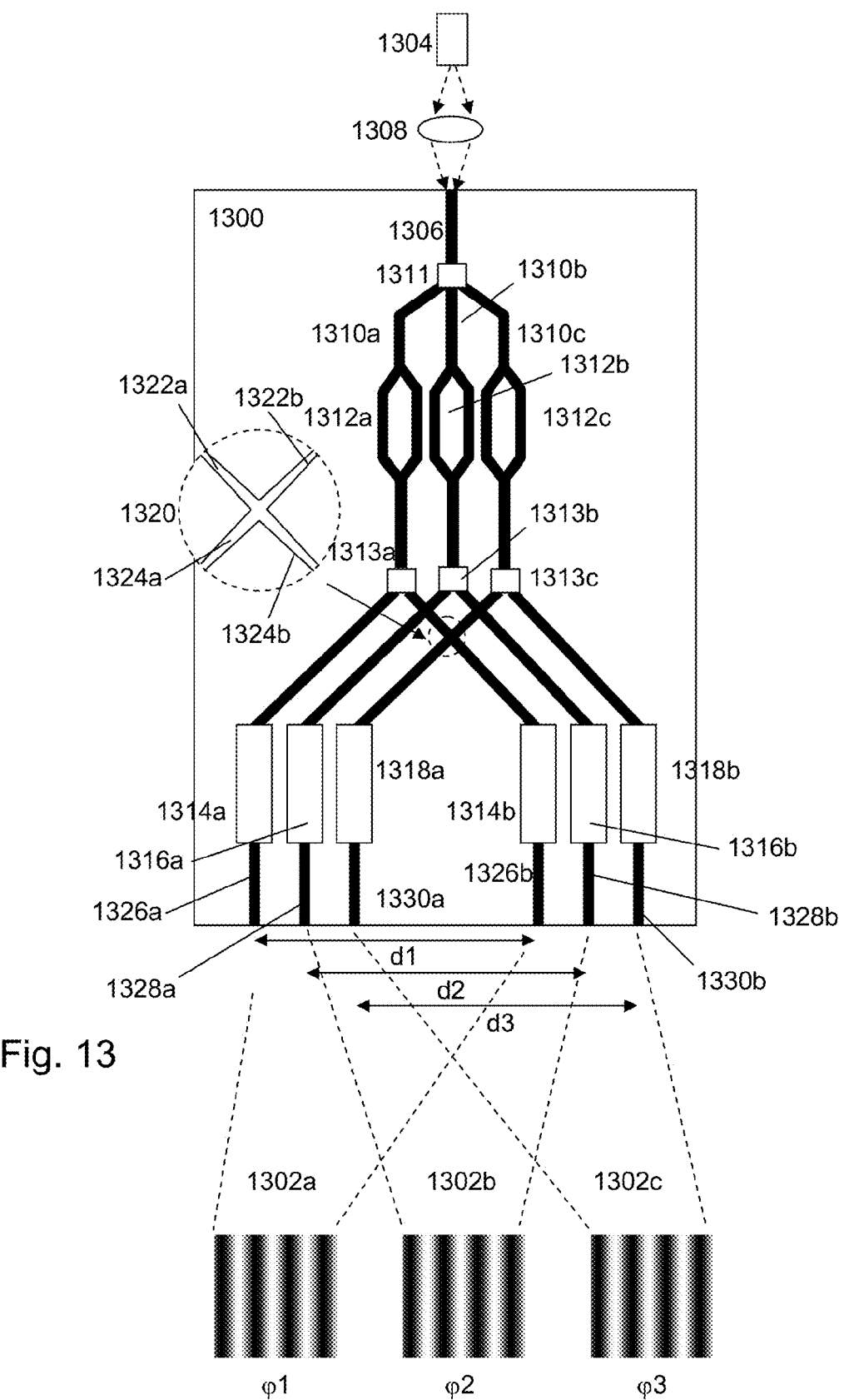
FIG. 13 is a schematic diagram of a fringe projector chip including multiple phase shifters.

Referring to FIG. 13, in another embodiment, a fringe projector chip 1300 allows three static phase projections. Three pairs of output waveguides (1326a and 1326b, 1328a and 1328b, and 1330a and 1330b) are interleaved such that the separation among the fringes output from each pair is minimized, thus reducing either measurement error or the complexity of post-measurement processing to account for this separation.

In this embodiment, a laser diode light source 1304 is coupled onto an on-chip laser-to-waveguide coupler 1306 by a free space optical lens 1308. Once on fringe projector chip 1300, the light is divided into three phase shifter channels 1310a, 1310b, 1310c by a waveguide-based 1-to-3 splitter 1311. Each phase shifter channel has a Mach-Zehnder interferometry (MZI) type waveguide on-off switch 1312a, 1312b, 1312c to turn on or off light passing along that channel.

The light along each path is split into two arms by a 3 dB splitter 1313a, 1313b, 1313c. In order to reducing the separation among the pairs of output waveguides, the two arms of each phase shifter are separated such that a first arm 1314a, 1316a, 1318a of each phase shifter is routed to the left side of chip 1300 and a second arm 1314b, 1316b, 1318b is routed to the right side of the chip. Output waveguide pairs 1326a and 1326*b*, 1328*a* and 1328*b*, and 1330*a* and 1330*b* are interleaved such that the first waveguide 1326*a*, 1328*a*, 1330*a* of each pair outputs light on the left side of chip 1300 and the second waveguide 1326*b*, 1328*b*, 1330*b* outputs light on the right side of the chip. The distance between the first waveguide and the second waveguide of each pair is d (where d1=d2=d3=d).

In routing each arm of the phase shifters to a different side of the chip, waveguide crossings between passive waveguides of the phase shifters are used. An exemplary waveguide crossing 1320 between a first single mode waveguide input path 1322*a* and a second single mode waveguide input path 1322*b* gradually tapers the two input paths into wider multimode waveguides in order to reduce crossing losses and crosstalk. Once crossed, the waveguide is tapered back into single mode waveguide output paths 1324*a*, 1324*b*.

Phase shifter active waveguide pair 1314 generates a phase difference of $\Delta\theta_1$, phase shifter active waveguide pair 1316 generates a phase difference of $\Delta\theta_2$, and phase shifter active waveguide pair 1318 generates a phase difference of $\Delta\theta_3$. Because of the layout of the output waveguides, fringe patterns 1326 generated by each phase shifter are projected onto approximately the same position on the target object. MZI on-off switches 1312*a*, 1312*b*, 1312*c* can be alternately turned on or off as appropriate to allow only one output waveguide pair at a time to generate a fringe pattern.

Figure 14:
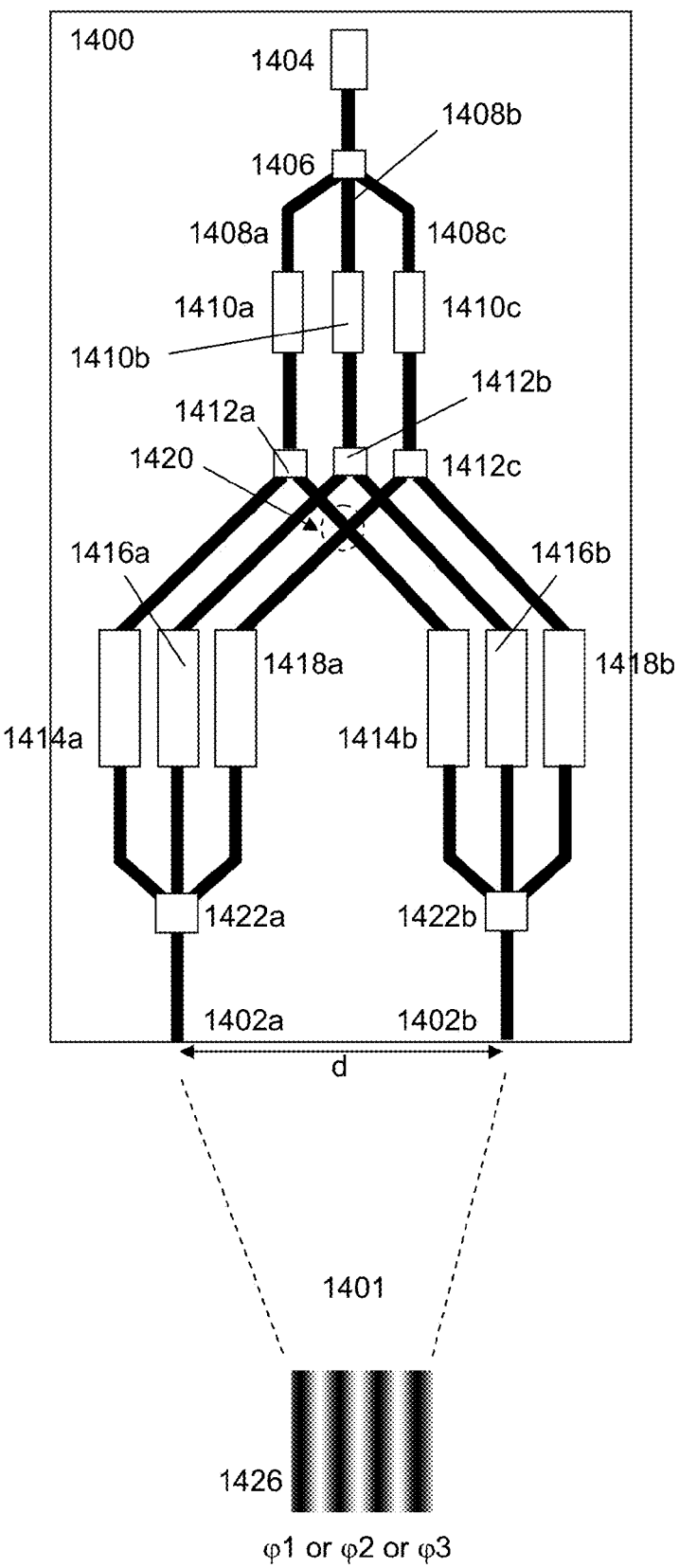
FIG. 14 is a schematic diagram of a fringe projector chip including multiple phase shifters.

Referring to FIG. 14, in an alternative embodiment of a fringe projector chip 1400, three static phase projections 1401 can be generated using a single output waveguide pair 1402*a*, 1402*b*. By using only a single output waveguide pair, no offset between fringe patterns of different phase is observed, reducing measurement error and simplifying post-measurement data analysis.

Fringe projector chip 1400 is an example of a fully integrated fringe projector chip that includes an on-chip laser diode 1404. Light from laser diode 1404 is split by an on-chip 1-to-3 splitter 1406 into three phase shifter paths 1408*a*, 1408*b*, 1408*c*. There is a VOA 1410*a*, 1410*b*, 1410*c* along each phase shifter path to adjust the intensity of light along the path, for instance to compensate unequal light intensities due to fabrication variations in the light paths. VOAs 1410*a*, 1410*b*, 1410*c* can also be used as on-off switches. Each light path includes a 3 dB splitter 1412*a*, 1412*b*, 1412*c* to split the light along that path into two paths, which are received by phase shifter active waveguide pairs 1414*a* and 1414*b*, 1416*a* and 1416*b*, and 1418*a* and 1418*b*. Waveguide crossings 1420 allow for the light paths to cross each other. After passing through the phase shifters, the light is combined by output path combiners 1422*a*, 1422*b* into the single output waveguide pair 1402*a*, 1402*b*. Combiners 1422*a*, 1422*b* are, for instance, the combiner shown in FIGS. 11E and 11F. The distance between the two output waveguides is d.

Phase shifter active waveguide pair 1414 generates a phase difference of $\Delta\theta_1$, phase shifter active waveguide pair 1416 generates a phase difference of $\Delta\theta_2$, and phase shifter active waveguide pair 1418 generates a phase difference of $\Delta\theta_3$. Because of the layout of the output waveguides, fringe patterns 1426 generated by each phase shifter are projected onto the same position. VOAs 1410*a*, 1410*b*, 1410*c* can be alternately turned on or off as appropriate to allow only one output waveguide pair at a time to generate a fringe pattern.

4.2 Other Embodiments of Multiple Phase Shifters

Figure 15:
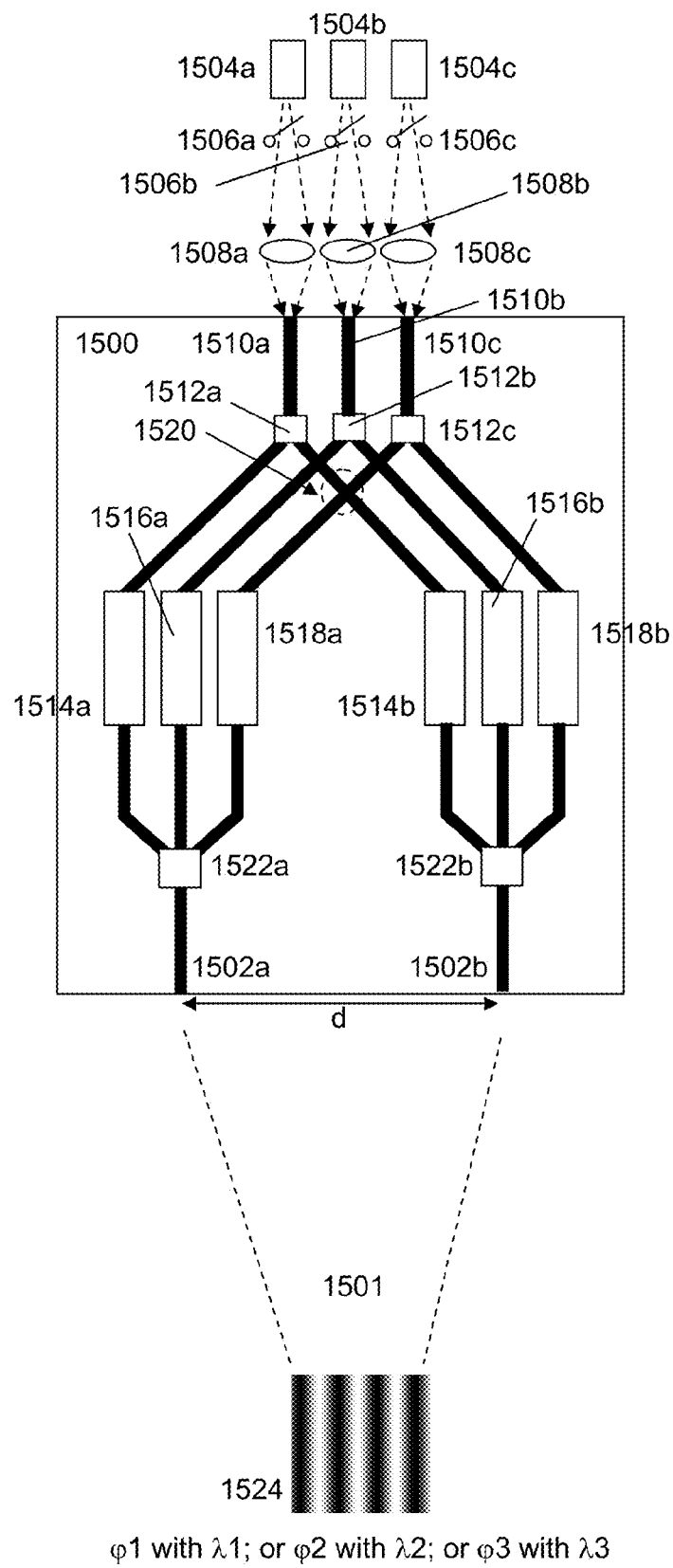
FIG. 15 is a schematic diagram of a fringe projector chip for fringe projection of multiple wavelengths.

Referring to FIG. 15, a multi-wavelength fringe projector chip 1500 allows multi-wavelength fringe projections 1501 using a single output waveguide pair 1502*a*, 1502*b*. Three laser sources 1504*a*, 1504*b*, 1504*c* generate light at three different wavelengths $\lambda_1$, $\lambda_2$, $\lambda_3$, respectively. An off-chip optical shutter 1506*a*, 1506*b*, 1506*c* turns each optical path on or off. The light from each path is coupled onto fringe projector chip 1500 by a free space optical lens 1508*a*, 1508*b*, 1508*c*.

On fringe projector chip 1500, each of the three input light paths is received by an on-chip laser-to-waveguide coupler array 1510*a*, 1510*b*, 1510*c* and split into a pair by 3 dB splitters 1512*a*, 1512*b*, 1512*c*. The pairs of optical paths are grouped as described above, with a first arm 1514*a*, 1516*a*, 1518*a* of a phase shifter sent to the left side of chip 1500 and a second arm 1514*b*, 1516*b*, 1518*b* of the phase shifter sent to the right side of chip 1500. Waveguide crosses 1520 are positioned as needed. After passing through the phase shifters, the light is combined by output path combiners 1522*a*, 1522*b* into the single output waveguide pair 1502*a*, 1502*b*. Combiners 1522*a*, 1522*b* are, for instance, the combiner shown in FIGS. 11E and 11F. The distance between the two output waveguides is d. A fringe pattern 1524 is generated.

Phase shifters comprising active waveguide pairs 1514, 1516, 1518 are dynamic phase shifters rather than static phase shifters, which ramp to and stabilize at phase values consecutively according to measurement criteria. The shutters 1506*a*, 1506*b*, 1506*c* that control the on-off state of each wavelength path can be turned on or off simultaneously or alternately, allowing multi-fringe-frequency (i.e., multi-fringe-wavelength) phase shift interferometry. As described in the previous paragraphs, the use of multi-light-frequency with the same separation of the output waveguide pairs is inherently multi-fringe-frequency in nature. Thus the unwrapping scheme described in FIG. 1D can also be used to facilitate the measurement.

Figure 16:
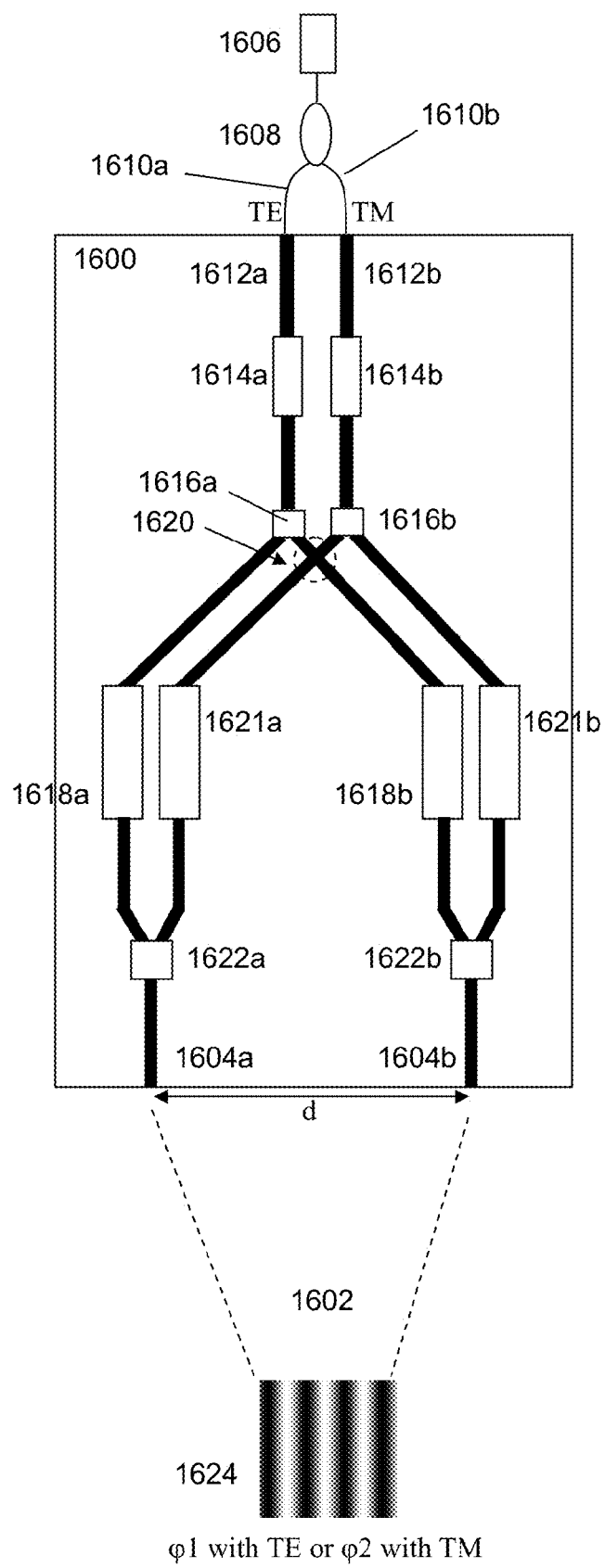
FIG. 16 is a schematic diagram of a fringe projector chip for fringe projection at multiple polarizations.

Referring to FIG. 16, a multi-polarization fringe projector chip 1600 allows multi-polarization fringe projections 1602 using a single output waveguide pair 1604*a*, 1604*b*. Light from a laser diode light source 1606 is split by a fiber polarization splitter 1608 into a first input path 1610*a* for TE polarized light and a second input path 1610*b* for TM polarized light. That is, the two input paths have the same wavelength but different polarization. Input light paths 1610*a*, 1610*b* are coupled onto chip 1600 by on-chip fiber-to-waveguide couplers 1612*a*, 1612*b*. The intensity and on-off status of each path is controlled by an on-chip VOA 1614*a*, 1614*b*. The two input paths are split by a 3 dB splitter 1616*a*, 1616*b*, separated and grouped as described above using a waveguide cross 1620, and passed through phase shifter active waveguide pairs 1618*a*, 1618*b* and 1621*a*, 1621*b*. After passing through the phase shifters, the light is combined by output path combiners 1622*a*, 1622*b* into the single output waveguide pair 1604*a*, 1604*b*. The distance between the two output waveguides is d. A fringe pattern 1624 is generated.

Phase shifters comprising the active waveguide pairs 1618, 1620 are dynamic phase shifters that ramp to and stabilize at phase values consecutively according to measurement criteria. The VOAs 1614*a*, 1614*b* that control the on-off state of each wavelength path can be turned on or off alternately, allowing multi-polarization phase shift interferometry.

Figure 17:
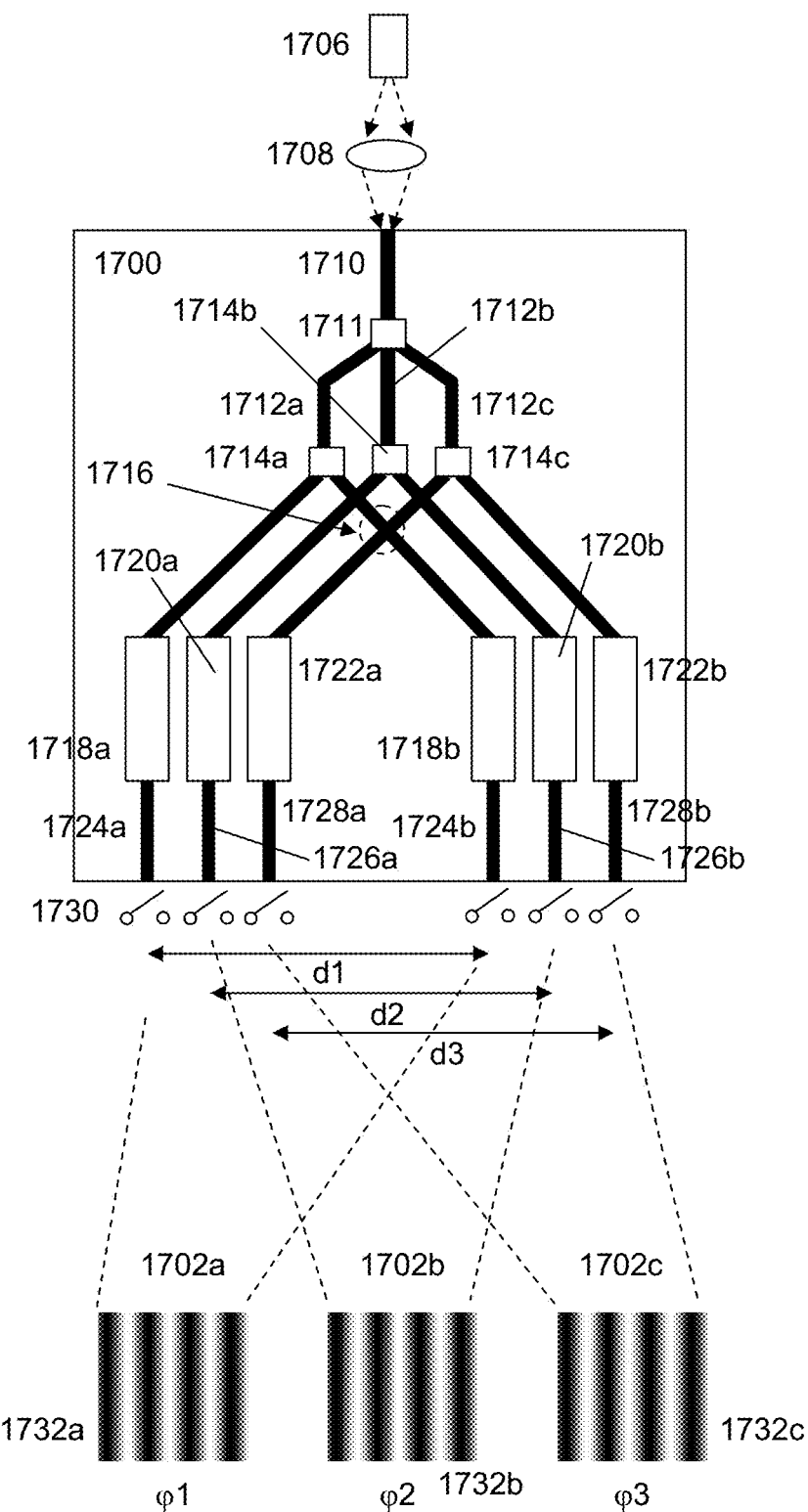
FIG. 17 is a schematic diagram of a fringe projector chip including multiple phase shifters.

Referring to FIG. 17, a fringe projector chip 1700 allows multi-fringe-frequency fringe projections 1702*a*, 1702*b*, 1702*c* using groups of closely spaced output waveguides. Light from a laser diode light source 1706 is coupled onto fringe projector chip 1700 by a coupling lens 1708 and an on-chip laser-to-waveguide coupler 1710. The input light is split into three paths 1712*a*, 1712*b*, 1712*c* by a 1-to-3 splitter 1711. Each path 1712*a*, 1712*b*, 1712*c* is then divided into two by a 3 dB splitter 1714*a*, 1714*b*, 1714*c*. The divided input paths are separated and grouped as described above using waveguide crosses 1716 and passed through phase shifters active waveguide pairs 1718a, 1718b; 1720a, 1720b; and 1722a, 1722b.

The output light from phase shifter active waveguide pair 1718a, 1718b is received by an output waveguide pair 1724a, 1724b; the output light from phase shifter active waveguide pair 1720a, 1720b is received by an output waveguide pair 1726a, 1726b; and the output light from phase shifter active waveguide pair 1722a, 1722b is received by an output waveguide pair 1728a, 1728b. The output waveguide pairs have different separation distances: the separation between waveguides 1724a and 1724b is $d_1$, the separation between waveguides 1726a and 1726b is $d_2$, and the separation between waveguides 1726a and 1726b is $d_3$. These different separations correspond to three fringe pattern frequencies. Fringe patterns 1732a, 1732b, 1732c are generated.

Off-chip optical shutters 1730 are used to alternately control the on-off state of each fringe-frequency waveguide pair, allowing multi-fringe-frequency phase shift interferometry.

Figure 18:
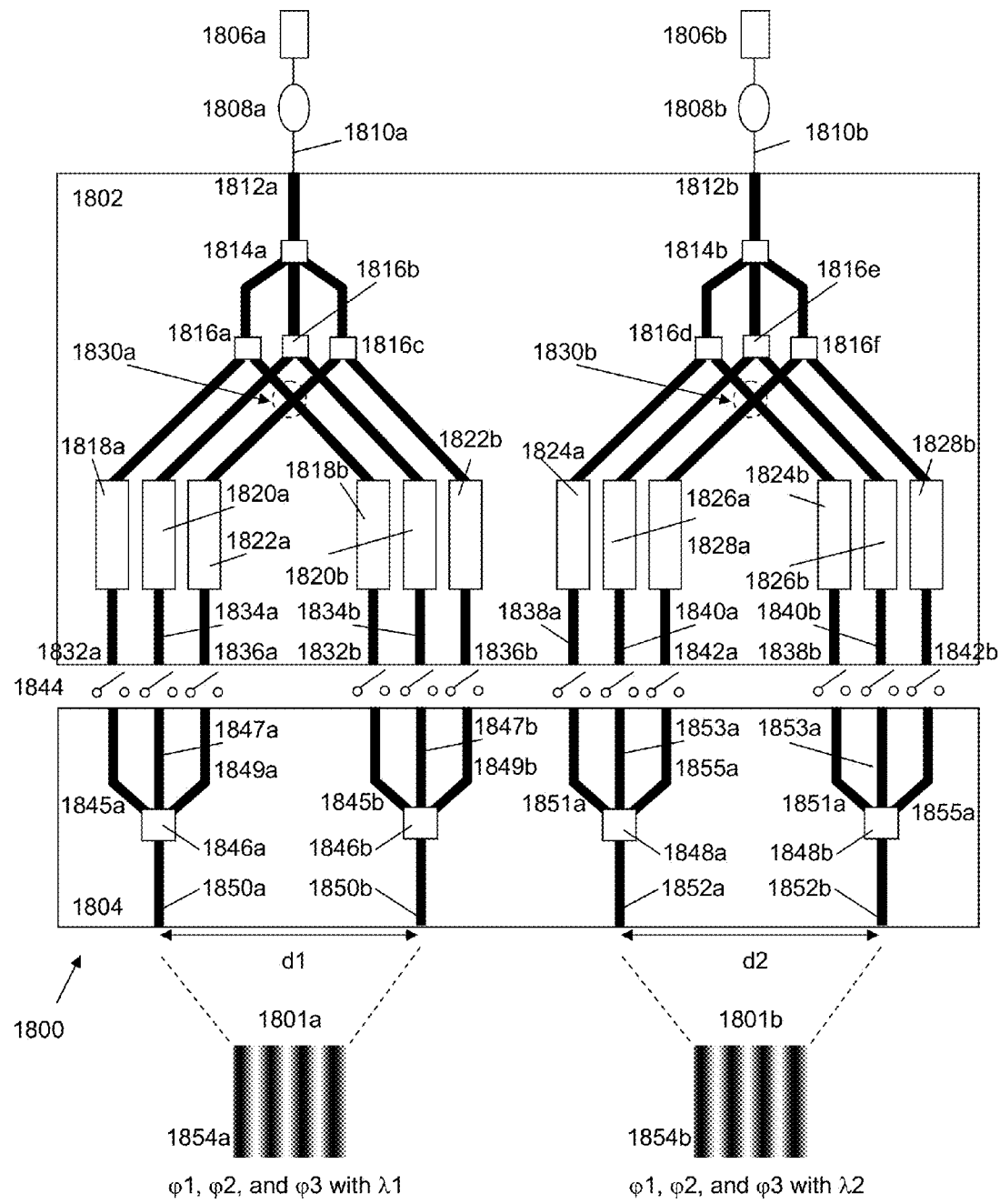
FIG. 18 is a schematic diagram of a pair of integrated circuits for fringe projection using multiple phase shifters.

In general, the multiple phase shifters described above may be combined in any fashion to allow multi-phase, multi-light-wavelength, multi-light-polarization, and/or multi-fringe-frequency phase shift interferometry. For instance, referring to FIG. 18, in one embodiment, a fringe projector system 1800 allows three static phase projections 1801a and 1801b at two different input light wavelengths. Two chips are used in fringe projector system 1800: a fringe projector chip 1802 and a combiner chip 1804.

Two laser diode light sources 1806a, 1806b generate light at two different wavelengths $\lambda_1$, $\lambda_2$. Fiber switches 1808a, 1808b turn each optical path on or off. The light from each path is carried on an optical fiber 1810a, 1810b and coupled onto fringe projector chip 1802 by an on-chip fiber-to-waveguide coupler 1812a, 1812b. The light in each path is split into three paths by a 1-to-3 splitter 1814a, 1814b. Each path is then split into an array of 3 dB splitters 1816a-1816f. The pairs of optical paths are grouped as described above. A first arm 1818a, 1820a, 1822a of a static phase shifter for light at wavelength $\lambda_1$ is sent to first region of chip 1802 and a second arm 1818b, 1820b, 1822b of a static phase shifter for light at wavelength $\lambda_1$ is sent to a second region of chip 1802. A first arm 1824a, 1826a, 1828a for light at wavelength $\lambda_2$ is sent to a third region of the chip and a second arm 1824b, 1826b, 1828b for light at wavelength $\lambda_2$ is sent to a fourth region of the chip. Waveguide crosses 1830a and 1830b are positioned as needed.

After passing through the phase shifters, the light is output from fringe projector chip 1802 by output waveguide pairs 1832a, 1832b; 1834a, 1834b; and 1836a, 1836b at wavelength $\lambda_1$ and output waveguide pairs 1838a, 1838b; 1840a, 1840b; and 1842a, 1842b at wavelength $\lambda_2$. Light in each output waveguide pair may have a different static phase difference $\Delta\theta_1$, $\Delta\theta_2$, $\Delta\theta_3$.

An optical shutter array 1844 is positioned between fringe projector chip 1802 and combiner chip 1804 to turn on or turn off each waveguide pair according to measurement criteria. The light is then received onto combiner chip 1804, where the light at wavelength $\lambda_1$ is first received by waveguides 1845, 1847, and 1849, and then combined via output path 3-to-1 combiners 1846a, 1846b and passed into an output waveguide pair 1850a and 1850b; and light at wavelength $\lambda_2$ is first received by waveguides 1851, 1853, and 1855, and then combined via output path 3-to-1 combiners 1848a, 1848b and passed into another output waveguide pair 1852a and 1852b. Output waveguides 1850a and 1850b are separated by a distance d1; and output waveguides 1852a and 1852b are separated by a distance d2. Fringe patterns 1854a and 1854b are generated at two wavelengths, $\lambda_1$ and $\lambda_2$. The configuration in FIG. 18 enables multi-fringe-phase and multi-light-wavelength fringe phase shift interferometry in a compact chip-based system.

It is to be understood that the foregoing description is intended to illustrate and not to limit the scope of the invention, which is defined by the scope of the appended claims. Other embodiments are within the scope of the following claims.

What is claimed is:

1. An apparatus comprising a shape-measuring device for measuring a shape of a target object, wherein said shape-measuring device comprises a photonic integrated circuit comprising a phase shifter configured to accept input light and to emit a plurality of portions of light, each portion of light having a different phase, and an output element configured to output the light emitted from the phase shifter directly toward the target object, wherein said output element comprises a first output waveguide that directs light directly toward said target object and a second output waveguide that directs light directly toward said target object, wherein said first output waveguide is configured to act as a first point source and said second output waveguide is configured to act as a second point source, and a light detector positioned to receive reflected light from the target object;

wherein the photonic integrated circuit comprises a plurality of phase shifters, each phase shifter configured to accept input light and to emit a plurality of portions of light, each portion of light having a different phase.

2. The apparatus of claim 1, wherein the phase shifter includes: an input splitter configured to divide the input light into at least a first portion of light and a second portion of light; a first phase shifter waveguide configured to receive the first portion of the light and to change the phase of the first portion of the light; and a second phase shifter waveguide configured to receive a second portion of the light.

3. The apparatus of claim 2, wherein the first output waveguide is configured to output the first portion of the light and the second output waveguide is configured to output the second portion of the light.

4. The apparatus of claim 3, wherein the first portion of the light and the second portion of the light are coherent.

5. The system apparatus of claim 1, wherein the output element is configured to output the light emitted from each of the plurality of phase shifters.

6. The apparatus of claim 5, wherein the photonic integrated circuit further comprises a combiner configured to combine the light emitted from the plurality of phase shifters and to provide the combined light to the output element.

7. The system apparatus of claim 1, wherein the photonic integrated circuit further comprises a plurality of output elements, each output element configured to output the light emitted from at least one of the plurality of phase shifters.

8. The apparatus of claim 7, wherein a separation between the first output waveguide and the second output waveguide is the same for each output element.

9. The apparatus of claim 7, wherein a separation between the first output waveguide and the second output waveguide is different for each output element.

10. The apparatus of claim 7, wherein the plurality of first output waveguides are positioned in a first region of the photonic integrated circuit and the plurality of second output waveguides are positioned in a second region of the photonic integrated circuit.

11. The system apparatus of claim 1, wherein each of the plurality of phase shifters is associated with at least one of light at a different wavelength and light of a different polarization.

12. The apparatus of claim 1, wherein the photonic integrated circuit further comprises an output delivering system configured to deliver the light emitted from the phase shifter to the output element, the output delivering system comprising at least one of an integrated circuit based optical beam splitter, an integrated circuit based optical combiner, an integrated circuit based optical beam attenuator, and an integrated circuit based on-off switch.

13. The apparatus of claim 1, wherein the photonic integrated circuit comprises: a first integrated circuit including the phase shifter; and a second integrated circuit including the output element.

14. The apparatus of claim 13, further comprising an output delivering system configured to deliver the light emitted from the phase shifter to the output element, the output delivering system comprising at least one of an optical lens, a fiber or free space based optical beam splitter, a fiber or free space based optical combiner, a fiber or free space based optical beam attenuator, and a fiber or free space based on-off switch.

15. The apparatus of claim 1, wherein the photonic integrated circuit further comprises a light source configured to provide coherent input light to the phase shifter.

16. The apparatus of claim 15, wherein the light source includes at least one of a laser, a coherent light emitting diode (LED), and a coherent superluminescent LED.

17. The apparatus of claim 15, wherein the photonic integrated circuit further comprises an input delivering system configured to deliver light from the light source to the phase shifter, the input delivering system comprising at least one of an integrated circuit based optical beam splitter, an integrated circuit based optical combiner, an integrated circuit based optical beam attenuator, and an integrated circuit based on-off switch.

18. The apparatus of claim 1, further comprising a light source configured to provide coherent input light to the photonic integrated circuit.

19. The apparatus of claim 18, wherein the light source includes at least one of a laser, a coherent LED, and a coherent superluminescent LED.

20. The apparatus of claim 18, further comprising an input delivering system configured to deliver light from the light source to the phase shifter, the input delivering system comprising at least one of an optical lens, an optical beam splitter, an optical combiner, an optical beam attenuator, and an on-off switch.

21. The apparatus of claim 1, wherein the phase shifter is configured to change the phase of at least one of the plurality of portions of light by at least one of an electro-optic effect, a thermo-optic effect, and an acoustic-optic effect.

22. The apparatus of claim 1, further comprising a processor configured to determine a shape of at least a portion of the target object on the basis of the detected reflected light.

23. A method for determining a shape of a target object, the method comprising: receiving input light into a phase shifter fabricated on a photonic integrated circuit; emitting a plurality of portions of light from the phase shifter, each portion of light having a different phase; receiving the plurality of portions of light emitted from the phase shifter into an output element fabricated on the photonic integrated circuit; outputting the light from the output element directly toward the target object; and detecting light reflected from the target object;
wherein receiving input light into the phase shifter includes receiving input light into at least some of a plurality of phase shifters fabricated on the photonic integrated circuit.

24. The method of claim 23, wherein receiving the input light into the phase shifter includes: directing a first portion of the input light into a first phase shifter waveguide; and directing the second portion of the input light into a second phase shifter waveguide, wherein the first phase shifter waveguide is configured to change the phase of the first portion of the input light relative to the phase of the second portion of the input light.

25. The method of claim 23, further comprising applying electric power to at least a part of the phase shifter.

26. The method of claim 23, wherein receiving input light into the phase shifter includes selecting at least one of the plurality of phase shifters to change the phase of a first portion of light emitted by the selected phase shifter relative to a second portion of light emitted by the selected phase shifter.

27. The method of claim 23, wherein receiving the plurality of portions of light emitted from the phase shifter into the output element includes receiving the light emitted from at least some of the plurality of phase shifters into the output element.

28. The method of claim 23, wherein receiving the plurality of portions of light emitted from the phase shifter into the output element includes receiving the light emitted from each of at least some of the plurality of phase shifters into a corresponding one of a plurality of output elements.

29. The method of claim 23, wherein receiving input light into the plurality of phase shifters includes receiving input light having at least one of a different wavelength and a different polarization into each of the plurality of phase shifters.

30. The method of claim 23, further comprising controlling at least some of the plurality of phase shifters to generate a plurality of consecutive phase changes in the received input light.

31. The method of claim 23, further comprising determining a shape of at least a portion of the target object on the basis of the detected light.

* * * * *